United States Patent
Bons et al.

(10) Patent No.: US 10,717,107 B2
(45) Date of Patent: *Jul. 21, 2020

(54) SEALING MASS BASED ON MERCAPTO-TERMINATED BASE POLYMER/EPOXY COMPOUND AND METHOD FOR HARDENING BY MEANS OF A PHOTOLATENT CATALYST

(71) Applicant: Chemetall GMBH, Frankfurt (DE)

(72) Inventors: Peter Bons, Reichelsheim (DE); Swetlana Reichert, Frankfurt am Main (DE); Bjoern Sievers, Frankfurt (DE); Miroslav Kralev, Hanau (DE)

(73) Assignee: CHEMETALL GMBH, Frankfurt (DE)

( * ) Notice: Subject to any disclaimer, the term of this patent is extended or adjusted under 35 U.S.C. 154(b) by 87 days.

This patent is subject to a terminal disclaimer.

(21) Appl. No.: 15/550,519

(22) PCT Filed: Feb. 12, 2016

(86) PCT No.: PCT/EP2016/053006
§ 371 (c)(1),
(2) Date: Aug. 11, 2017

(87) PCT Pub. No.: WO2016/128548
PCT Pub. Date: Aug. 18, 2016

(65) Prior Publication Data
US 2018/0030322 A1    Feb. 1, 2018

(30) Foreign Application Priority Data

Feb. 13, 2015 (DE) .................. 10 2015 202 619

(51) Int. Cl.
| | |
|---|---|
| *C09D 181/04* | (2006.01) |
| *B05D 3/06* | (2006.01) |
| *C09K 3/10* | (2006.01) |
| *B05D 5/00* | (2006.01) |
| *F16B 33/00* | (2006.01) |
| *C08G 59/40* | (2006.01) |
| *F16B 37/14* | (2006.01) |

(52) U.S. Cl.
CPC ............ *B05D 3/065* (2013.01); *B05D 5/00* (2013.01); *C08G 59/4064* (2013.01); *C09K 3/1012* (2013.01); *F16B 33/004* (2013.01); *C09K 2003/1062* (2013.01); *F16B 37/14* (2013.01)

(58) Field of Classification Search
CPC ...... C09K 3/10; C09K 3/1012; C09D 181/04; C09D 163/00
See application file for complete search history.

(56) References Cited

U.S. PATENT DOCUMENTS

| | | | |
|---|---|---|---|
| 2,858,291 A | 10/1958 | Mcadam | |
| 3,645,816 A | 2/1972 | Billias et al. | |
| 8,952,124 B2* | 2/2015 | Rao | C07D 251/34 |
| | | | 528/373 |
| 2004/0157002 A1 | 8/2004 | Bons et al. | |
| 2010/0215937 A1* | 8/2010 | Matsukawa | C08G 18/44 |
| | | | 428/221 |
| 2013/0137817 A1 | 5/2013 | Laborbe et al. | |
| 2014/0378650 A1 | 12/2014 | Rao et al. | |
| 2015/0065599 A1* | 3/2015 | Kralev | C08L 81/00 |
| | | | 522/8 |
| 2018/0029071 A1* | 2/2018 | Bons | C09K 3/1012 |
| 2018/0094097 A1* | 4/2018 | Zook | C08L 81/02 |

FOREIGN PATENT DOCUMENTS

| | | |
|---|---|---|
| DE | 10108136 A1 | 8/2002 |
| WO | 2013151893 A2 | 10/2013 |
| WO | 2014066039 A1 | 5/2014 |
| WO | 2015014876 A2 | 2/2015 |
| WO | 2016128547 A1 | 8/2016 |

OTHER PUBLICATIONS

International Search Report and Written Opinion for International Application No. PCT/EP2016/053006, dated May 17, 2016, 9 pages.

* cited by examiner

*Primary Examiner* — Sanza L. McClendon
(74) *Attorney, Agent, or Firm* — Armstrong Teasdale LLP

(57) ABSTRACT

The present invention relates to a sealing compound for coating a substrate, which is a mixture of a predominantly uncured base mass and a curing agent containing at least one epoxy composition, wherein the base mass contains a mercapto-terminated base polymer based on polyether, polythioether, polythioethersulfide, polysulfide, copolymers thereof and/or mixtures thereof, wherein the base mass, the curing agent or both contain at least one photoinitiator based on a sterically hindered nitrogen-containing organic base, and, through the effects of high-energy actinic radiation, the at least one photoinitiator dissociates at least one radical per molecule based on a nitrogen-containing organic base, from which a nitrogen-containing organic base having a pKa value of the conjugated acid in the region of 6 to 30 is formed, which acts as an active catalyst for the curing of the base mass. The present invention also relates to a corresponding method for coating a substrate with a sealing compound.

22 Claims, No Drawings

SEALING MASS BASED ON MERCAPTO-TERMINATED BASE POLYMER/EPOXY COMPOUND AND METHOD FOR HARDENING BY MEANS OF A PHOTOLATENT CATALYST

CROSS-REFERENCE TO RELATED APPLICATIONS

This application is the national phase entry under of PCT/EP2016/053006 filed on Feb. 12, 2106 which claims priority to DE 102015202619.1 filed on Feb. 13, 2015, both of which are incorporated by reference in their entirety herein.

The present invention refers to a sealing compound based on a mercapto-terminated base polymer/epoxy composition as well as to a method for curing such a sealing compound on a substrate by means of a photolatent catalyst. In particular, herewith, metal substrates or coated metal substrates as well as substrates of other material groups may be coated. The sealing compounds are used also for connecting and/or gluing of (construction) elements as well as for sealing and/or filling of cavities and/or interspaces of (construction) elements.

The invention refers to a two-component system, comprised of a base mass and a curing agent.

In the following, the term "(uncured) base mass" is used for defining a mixture, which has not yet been admixed with a curing agent.

The term "sealing compound," on the contrary, refers, on one hand, to a mixture of a base mass and a curing agent, which, after mixing with the curing agent, in the uncured or already cured form, is prepared for use—i.e. in particular for coating of a substrate, on the other hand though to a cured mixture of a base mass and a curing agent—such as on a substrate.

Base masses and sealing compounds are used for a wide range of applications. They are eminently relevant to the aerospace sector, but also where, due to larger quantities of base mass and sealing compound, particular attention has to be focused on a fast curing, such as in the case of land vehicles. They are in particular used for sealing construction elements, connection of metal sheets, for example, to existing structures, such as segments of an airplane and/or for corrosion protection in places, where for example, in the region of holes, the corrosion protection layers of the metallic elements are damaged or removed. They may also exert a temporary carrying function, for example during transportation of structures to be mounted, which have to be subsequently provided with permanent supporting connection elements.

Particular requirements are set for the base and sealing compound for manufacturing and maintenance of aerospace vehicles: priority is set for sealing of fuel tanks, corrosion protection, aerodynamic smoothing and sealing of the pressurized fuselage, elasticity in a wide temperature range, resistance against various medium such as for example fuel, hydraulic fluids, condensed water, and anti-freezing liquid as well as a good sealing and adhesion effect on various substrates.

The manufacturing and maintenance of aerospace vehicles with a large number of connection sites with sealing compound was very onerous, until now, since the currently used sealing compounds in particular those with a long processing time, require a very long time for complete curing.

The drawback in known sealing compounds and methods for processing and curing is that with a given required processing time, not enough catalyst can be introduced in the sealing compound, in order to accelerate the curing to the desired extent. This, in particular with long processing times, causes the sealing compounds, due to their corresponding long curing times, to slow down the processes. A rapid through-hardening is however required in sealing compounds with long processing times.

Currently used fast curing sealing compounds with a processing time of 30 minutes, which contain mercapto-terminated base polymers, achieve, within about 180 minutes a Shore A hardness of 30. This requirement is fulfilled only with particular compositions of the sealing compound.

There is also the problem that in two-component and preferably room temperature curing sealing compounds, the time for reaching the tack-free state and the through-hardening time are considerably longer than the processing time—see table 1. Conventional coating methods are therefore often affected by extremely long cycle times in production—see table 2.

The criteria used for having a certain degree of curing may be considered the time for reaching a Shore A hardness of 30, which is defined by ISO 7619-1 or ISO 868 (durometer method). Moreover, the tack-free time as an indication of curing starting at the sealing compound surface is very important. Therefore, the processing time has to be as long as possible and the tack-free time and the through-hardening time have to be extremely short. With these parameters, in general, the processing time is set as the base, while the tack-free time and the through-hardening time are essentially determined by the type of sealing compound. Table 1 shows the time parameters important for curing of sealing compounds. Table 2 provides an overview of typical times for curing of sealing compounds with mercapto-terminated base polymers of the state of the art and compared to the invention.

TABLE 1

Definition of terms of processing times relevant for sealing compounds according to DIN 65262-1, ISO 868 and ISO 7619-1.

| Term | Definition |
| --- | --- |
| Processing time | Time from admixing of the base mass and curing agent or from curing start until the sealing compound cannot be applied anymore due to an increase in viscosity (DIN 65262-1, par. 3.1.2.3) |
| Tack-free time | Time from admixing of the base mass and curing agent or from curing start until reaching a tack-free surface of the sealing compound (DIN 65262-1, par. 3.1.2.5) |
| Through-hardening time | Time from admixing of the base mass and curing agent or start of curing to reaching an initial Shore A hardness of 30 (DIN 65262-1, par. 3.1.2.6; ISO 868; ISO 7619-1) |

TABLE 2

Overview of trends and selected typical times for curing of conventional sealing compounds of the state of the art (sealing compounds of epoxy-cured polythioether, which cures at room temperature and manganese-dioxide cured polysulfide-sealing compounds) and of the invention for mercapto-terminated base polymers.

| Term (time in minutes) | Conventional sealing compounds | | | Inventive sealing compounds | | |
|---|---|---|---|---|---|---|
| Processing time | 10-15 | About 25-35 | About 120 | 10-15 | About 25-35 | About 120 |
| Tack-free time | 30-120 | 90-600 | 480-840 | 0.01-5 | 0.01-5 | 0.01-10 |
| Through-hardening time | 60-240 | 150-1800 | 540-2880 | 10-60 | 20-120 | 40-420 |

Moreover, the conventional sealing compounds of types A and B, which usually are used in a flat form or as beads for coating of bolts, rivets or other construction elements, with a construction time of 30 minutes, typically require 1.5 to 5 hours, for getting tack-free, and typically 2.5 to 8 hours for reaching a Shore A hardness of 30. In case of interlayer compounds (class C), the squeezed material may be cured with UV light.

With the present invention, the time required may be considerably reduced due to the much shorter tack-free time and the much shorter through-hardening time with a sufficiently long processing time. In this way, the cycle time for the further use of the components coated with the sealing compound may be drastically reduced.

The problem with the conventional high value two-components sealing compounds based on mercapto-terminated base polymers is that a relatively high content of free catalyst is required in order to obtain a fast through curing and a short tack-free time. The processing time of the sealing compound is strongly reduced proportionally to the reduction of the tack-free time.

The criteria used for judging mechanical load capacity of a slower curing sealing compound during curing is often, beside or instead of tensile and shear resistance, a Shore A hardness of at least 35 or even only 30, in which the sealing compound has no longer a plastic deformability and no longer smears during transportation, for example. A typical Shore A hardness for a completely cured sealing compound is often equal to 45+/−10.

DE 101 08 136 A1 describes fast curing sealing compounds with a long processing time. Here, temperature, IR-radiation or mechanical forces are used for activating the fast curing as well as encapsulated or deactivated catalysts, in order to keep the processing time as long as possible.

U.S. Pat. No. 3,645,816 describes a method for sealing leaks in liquid tanks, for example, by using a polysulfide sealing compound, wherein for speeding up the curing, the heating of the sealing compound is recommended at temperature of 60 to 65° C., in order to obtain a particularly fast tack-free time and curing, which, however, can only be used with certain sealing compounds. The heating of large or inaccessible substrates however is very difficult.

US 2013/0137817 A1 describes a Cure On Demand sealing compound based on polysulfide. In it, a blocked curing agent is used, which is released/activated at 60-120° C. for up to 2 hours. This high activation temperature and the long activation time are a drawback for most of substrates used in the aircraft industry (for instance aluminum alloys), due to their high thermal expansion coefficient.

UV curable one- or two-component room-temperature-curable coatings are known, which have no sulfur-containing polymers, and which do not show the particular highly valuable properties of aircraft sealing compounds such as high resistance against different mediums like fuel, hydraulic liquids, condensed water, and anti-freeze liquid. They are generally based on UV-curing mixtures with acrylate-pre-polymers with double bonds, which radically polymerize in the presence of a photoinitiator as a radical generator and may cure. However, without UV radiation, in these sealing compounds, no complete curing is achieved.

A goal, which has been pursued in vain in the development of base masses and sealing compounds is the provision of a base and sealing compound, which allows at room temperature or temperatures only slightly above room temperature a processing time of, for example, at least 0.5 hours, at least 1 hour or even about 2 hours, without requiring a curing time for through-hardening which is a multiple of this time. A similar goal, which has been pursued for a long time without success is the provision of a base mass and sealing compound, which start curing on demand.

The object is to propose a base mass and sealing compound as well as a method for coating of substrates with this sealing compound with mercapto-terminated polymers, in which, while ensuring long processing times, the shortest curing times possible are achieved. For the use in the aerospace sector, the sealing compound has to achieve, if possible, the same high quality properties, as of conventional sealing compounds used to this end. These properties include a high resistance to different mediums, such as fuel resistance at room temperature, at 60° C. and at 100° C., hydraulic liquids, condensed water, and anti-freeze liquid, high thermal resistance, high flexibility at low temperatures, high resistance to weather agents, high resistance to peeling on different substrates, high rupture elongation and high tensile resistance.

Moreover, the object is to propose a base mass and sealing compound, in particular for the aircraft industry, whose curing is activated, if possible, "on demand." In case of a missing command it is also advantageous, if the sealing compound still completely cures, even though at a slower speed.

It has now been discovered, that it is possible to produce base masses and sealing compounds, which may be cured on demand. It has also been found that it is possible to produce base masses and sealing compounds, which, after irradiation with high-energy actinic radiation, have a very short tack-free time and may have a through-hardening time, which is about in the order of magnitude of the processing time (see above table 2), so that in the construction of aircraft, shorter waiting times and cycle times may be achieved and therefore productivity may be increased. It has also been found that these base masses and sealing compounds have about the same high-quality properties as the conventional base masses and sealing compounds for the aerospace sector, in particular a high fuel resistance as well a high elasticity.

Moreover, the inventive sealing compound systems have the advantage that curing in not irradiated areas, so-called "shade areas," may be achieved as well as post-curing, so that in spite of a short irradiation time and/or incomplete irradiation over the sealing compound application area, a complete curing may be achieved.

The inventive method is characterized in that the curing of the sealing compound is performed on demand, and with such high speed, that a tack-free surface of the sealing compound is achieved, from irradiation start, in a tack-free time of less than 15 minutes. The onset of curing of a sealing compound coincides, in a preferred embodiment, with the start of the high-energy actinic irradiation. Tack-free time is preferably less than 10 minutes, less than 5 minutes, less than 3 minutes or less than 10 seconds. Through-hardening times are achieved, depending on layer thickness, between 1 and 1,000 minutes, preferably between 10 and 360 minutes and in particular from 20 to 90 minutes.

Therefore, the base masses and sealing compounds of the present invention may be indicated as a new type of sealing compounds, which are particularly suited for airplanes, with a relatively long processing time and with stronger curing taking place on demand, whereas accelerated curing takes place afterwards. In fact, these masses are particularly fast in achieving a tack-free state.

The object is achieved with a sealing compound for coating a substrate, which contains a mixture of a predominantly uncured base mass, i.e. a base mass with a viscosity of <2500 Pa·s, and a curing agent containing at least one epoxy composition, wherein the base mass contains a mercapto-terminated base polymer, based on polyether, polythioether, polythioethersulfide, polysulfide, copolymers thereof and/or mixtures thereof, the base mass, the curing agent or both contain at least one photoinitiator based on a sterically hindered nitrogen-containing organic base, and, through the effects of high-energy actinic radiation, the at least one photoinitiator cleaves at least one radical per molecule based on a nitrogen-containing organic base, from which a nitrogen-containing organic base having a pKa value of the conjugated acid in the region of 6 to 30 is formed, which acts as an active catalyst for the curing of the base mass.

The pKa value of the conjugated acid of the nitrogen-containing organic base, which acts as active catalyst for curing of the base mass, preferably lies in the range from 7 to 28, further preferably from 8 to 26, particularly preferably in the range from 9 to 20 and most preferably from 10 to 15.

The at least one photoinitiator based on a sterically hindered nitrogen-containing organic base preferably is a sterically hindered tertiary amine, a sterically hindered amidine and/or a sterically hindered guanidine. The at least one photoinitiator correspondingly cleaves, when irradiated by high-energy actinic radiation, at least one radical per molecule based on a tertiary amine, amidine and/or guanidine.

The present invention also refers to a method for coating a substrate with above mentioned sealing compound, wherein a substrate is coated with the sealing compound, the sealing compound is irradiated with high-energy actinic radiation and the sealing compound is then cured.

It may also refer to a method for bonding of elements, for sealing and/or filling of cavities and/or interspaces of elements with a sealing compound as well as to the production of a cured sealing compound. Elements are in particular construction elements.

The viscosity of the base mass and sealing compound may also be so low, that it is possible to inject the same on the substrate by means of a suitable arrangement.

No increased temperature is required, in order to activate the inventive photoinitiator or for use the so formed catalyst as a catalyst, but only a highly energetic actinic radiation such as UV light.

Another advantage of the present invention is that curing may be effected at room temperature or only slightly above room temperature, such as temperatures in the range from 10 to 40 or from 15 to 30° C.

In case of highly energetic actinic radiation, at least one photoinitiator according to the invention may cleave at least one radical per molecule based on a nitrogen-containing organic base, which, in particular, is activated by H-absorption—for example in the case of tertiary amine—and/or H-emission—for example in the case of amidine—and may in particular act as catalyst for curing. It is herein preferred that the photoinitiator, in case of high-energy actinic irradiation, releases and/or forms a tertiary amine, amidine and/or guanidine, and that the released and/or formed amine, amidine or guanidine catalyzes the reaction between mercapto-terminated base polymer and epoxy-based curing agent. It is particularly preferred that the photoinitiator activates and/or accelerates the reaction of the epoxy composition with mercaptan, if the sealing compound is subject to highly energetic actinic radiation.

It has now also been found that fast and on-demand-curing sealing compounds may be produced with highly valuable properties from mercapto-terminated base polymers and adequate additives, if an epoxy curing is selected and if photoinitiators are added in a quantity which, in case of highly energetic actinic radiation, releases at least one radical based on tertiary amine and/or amidine and/or guanidine per molecule and preferably form a proportion in the range from 0.05 to 5 wt.-% or in the range from 0.1 to 4 wt.-% or in the range from 1 to 3 wt.-% of tertiary amine and/or amidine and/or guanidine composition with respect to the entire composition of the inventive sealing compound or in the range from 0.2 to 23 mmol or in the range from 0.45 to 18.3 mmol or in the range from 4.5 to 14 mmol of tertiary amine and/or guanidine composition per 100 g of base mass. This proportion of tertiary amine or amidine or guanidine is evidently enough as a catalyst to let cure about 7-mm-thick layers, beads or bulges of sealing compounds.

When energetic actinic radiation acts on the sealing compound and/or on the already curing sealing compound, at least one photoinitiator, while cleaving, releases at least one radical per molecule based on tertiary amine and/or amidine and/or guanidine. The photoinitiator is not used, as usual, for radical curing such as of acrylates and meth-acrylates, but to activate a chemical reaction of an epoxy composition with the mercapto-terminated "base polymers," selected from polymers and/or copolymers, in the form of a poly-addition. In fact, acrylates and meth-acrylates and other organic polymeric systems of the state of the art have a plurality of double bonds, which usually are missing in the mercapto-terminated base polymers of the present application. Moreover, in the radical curing of (meth)acrylate, prevalently or only benzoyl-radical is required, whereas in the curing of the mercapto-terminated base polymers, the tertiary amine formed from the tertiary amine-radical or the amidine formed from the amidine-radical or the guanidine formed from the guanidine-radical are required, whereas the benzoyl-radical is not required in the inventive method.

The mercapto-terminated base polymers in the method of the state of the art, as far as this is known to the applicant, cannot be radically polymerized with a photoinitiator without percentages of compositions or groups with double bonds, such as, for example, those based on (meth)acrylate. However, such proportions of double bonds of the inventive base mass or sealing compound are not added, so that correspondingly, according to the applicant, no radical curing may take place.

The chemical composition of many UV curing coatings of the state of the art is based on acrylates, whose cross-linking is activated by irradiation with UV light, in particular in presence of photoinitiators. In case of thicker layers, the UV light may however penetrate only partially in such coatings, so that a curing of layer thicknesses of more than 200 µm, for example, cannot be achieved in practice.

The present invention is, on the contrary, based on the use of chemical reaction of epoxy groups with mercapto groups in presence of tertiary amine and/or amidine and/or guanidine, which evidently acts as catalyst of this reaction. It is herein possible to react also layers of sealing compound much thicker than 200 µm, and cure for example layer thicknesses of about 7 mm, since the amine or amidine or guanidine released by the photoinitiator and then transformed into catalytic active amine and/or amidine and/or guanidine may evidently distribute over a longer distance through the sealing compound. Moreover, by using of an additional free catalyst, which preferably is a free nitrogen-containing organic base with a pKa value of the conjugated acid in the range from 6 to 30, particularly preferably a free tertiary amine and/or free amidine and/or free guanidine, a fast deep-curing as in a conventional sealing compound may take place.

Herein, "deep curing" means a curing reaction, which is not activated at the surface of the UV curing sealing compound by direct irradiation with UV light, but which starts several millimeters under the surface of the sealing compound. The deep curing depends on the selection of fillers and other additives, which, inter alia, influence the color of the sealing compound. Normally, surface curing takes place up to a depth of 2 mm and beneath that, the deep curing is misused, achieved.

Since at this depth no direct UV light may radiate, an additional free catalyst is used, which supports this deep curing. Depending on the selection of the free catalyst the processing time and the through-hardening time may be adapted to the application.

In the present invention, a chemical curing is provided, wherein the inventive photoinitiator is deprived of its original function and is usually used only for releasing of the amine and/or amidine and/or guanidine radial and for formation of a catalyst based on tertiary amine or amidine or guanidine, but not as a photoinitiator in its originally used sense.

Preferably, no or almost no heat is provided to the chemical system from the outside, whereas the sealing compound cures from the time of effecting the energetic actinic radiation, prevalently or completely, in the temperature range from 10 to 40° C. or from 15 to 30° C. A temperature above 40° C. in the inventive method is provided or generated only rarely. An advantage of the inventive method is that no high temperatures are required. Moreover, temperatures above 80° C. may optionally cause stresses in the component, due to thermal elongation, thereby reducing the quality of the nearby components such as aluminum alloys and fiber composite materials. Heating to more than 40° C. or even more than 60° C. is in general—if any, obtained only by actinic radiation and optional exothermal chemical reactions, usually only for 1 to 15 minutes. The curing preferably takes place at temperatures in the range from 10 to 40° C., from 15 to 30° C., wherein in specific cases even for times of only 0.1 to 15 minutes a temperature above 40° C. to 50° C. is used. Particularly preferably curing takes place for the entire time in the range from 15 to 30° C. Particularly preferably, curing takes place for most of the time or for the entire time at temperatures below 30° C.

The inventive base mass and sealing compound preferably has at least one photoinitiator, which is a composition based on at least one tertiary amine-group and/or amidine-group and/or guanidine-group, which is sterically hindered. The inventive photoinitiators may have different structures.

Different from known sealing compound systems, in which curing is obtained by isocyanates or vinyl compounds, the newly described system does not operate with catalysts such as acetophenones, 1-hydroxycyclo-hexylphenylketon, 2-hydroxy-2-methyl-1 phenylpropane-1-one, 2,4,6-trimethylbenzoyl-diphenylphosphine-oxide, 2-dimethyl-amino-2-(4-methyl-benzyl)-1-(4-morpholin-4-yl-phenyl)-butan-1-one), 2-benzyl-2-dimethylamino-1-(4-morpholinophenyl)-butanone-1.

These catalysts are bases, which are too weak. The inventive photoinitiators are therefore photolatent strongly basic nitrogen compositions. The pKa value of the conjugated acid of the released nitrogen-containing organic base correspondingly is from 6 to 30, preferably from 7 to 28, further preferably from 8 to 26, particularly preferably from 9 to 20 and most preferably from 10 to 15. Preferably, the photoinitiator is selected from those based on sterically hindered amine and/or amidine and/or guanidine, which, when subject to high-energy actinic radiation, releases and/or forms a tertiary amine and/or amidine and/or guanidine. Preferred photoinitiators are those that when subject to actinic high-energy radiation, cleave 1, 2 or 3 tertiary amine radicals or amidine radicals or guanidine radicals and/or form at least one bond with 1, 2 or 3 tertiary amine-groups or amidine-groups or guanidine-groups per molecule.

Optionally, the inventive photoinitiator is a latent catalyst, in which the active catalyst is released or formed. However, such photoinitiators may optionally have a very low catalytic effect before a high-energy actinic irradiation.

The inventive photoinitiator preferably pertains to the class of amidine and/or tertiary amine and/or guanidine. In fact, the chemical structure of such photoinitiators allows the release of an amidine radical and/or amine radical and/or guanidine radical and the formation of an amidine and/or tertiary amine and/or guanidine after high-energy actinic irradiation, which starts and/or accelerates the reaction between the mercapto-terminated polymer and the epoxy based curing agent. In this way, a processing time of the inventive sealing compound after admixing of both components is guaranteed for a time frequently in the range from 15 minutes to 4 hours, preferably from 20 minutes to 2 hours or from 30 minutes to 1 hour, as long as no irradiation with high-energy actinic radiation takes place. The sealing compound is an uncured mixture, in that no strong curing has started during the time of production and storage of the sealing compound and their starting masses.

When the base mass or sealing compound is subject to a high-energy actinic radiation, this causes a curing "on demand," a particularly fast surface curing, which is indicated by the tack-free time, and a fast through-hardening.

Herein, initially externally a tack-free layer is formed, which is followed by a fast deep-curing. In this case, times in the range from 0.01 to 5 minutes for tack-free time and 1 to 1,000 minutes in case of through-hardening are achieved, depending on layer thickness. For sealing compounds with an irradiated thickness of 1 mm, often times in the range from 0 to 5 minutes to tack-free time and of 1 to 30 minutes to through-hardening are achieved. In this case, times for sealing compounds with an irradiated thickness of 4 mm in the range from 0 to 5 minutes to tack-free time and 10 to 120 minutes to through-hardening are obtained. In particular, often, times for sealing compounds with an irradiated thickness of 7 mm in the range from 0 to 5 minutes to tack-free time and 20 to 240 minutes to through-hardening are achieved.

The photoinitiator may be contained as a component of the base mass and/or the curing agent. The photoinitiator therefore is also part of the sealing compound, which is prepared for use. The photoinitiator is preferably used as a latent catalyst, which provides the tertiary amine and/or amidine and/or guanidine, which acts as a catalyst.

According to a particularly preferred embodiment, at least one photoinitiator is a composition based on a sterically hindered amidine, preferably photolatent 1,8-diazabicyclo [5.4.0]undec-7-ene (DBU; see formula I) and/or 1,5-diazabicyclo[4.3.0] non-5-ene (DBN; see formula II). As a sterically hindered composition, the nitrogen atom, which is twice bonded in the free amidine carries a substituent R. This substituent R may have a different structure. It may contain, for example, an alkyl-group or a phenyl-group. Combinations of different organic residues, with a short or long chain, branched or linear, may be provided in the substituent R.

Formula I: sterically hindered DBU Formula II: sterically hindered DBN

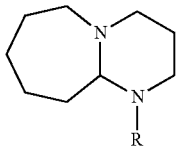 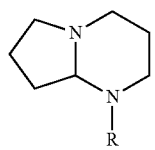

If the sterically hindered composition is subject to high-energy actinic radiation, it dissociates into the amidine radical and the radical composed of the substituent group R. The amidine radical absorbs an H atom and transforms to reactive amidine.

It is also preferred to use a photoinitiator, which is based on sterically hindered tertiary amine. A suitable sterically hindered amine may be based, for example, on triethylene-diamine (1,4-diazabicyclo[2.2.2]octane).

It is also preferred, that a photoinitiator is used, which is based on sterically hindered guanidine. A suitable sterically hindered guanidine may be based, for example, on blocked photolatent TMG (tetramethylguanidine).

It is very important, that both the tertiary amine released after irradiation with UV light and amidine and guanidine are strong bases and the pKa values of their conjugated acids are from 6 to 30, preferably from 7 to 28, more preferably from 8 to 26, particularly preferably from 9 to 20 and most preferably from 10 to 15. Before the irradiation with UV light, the pKa values of the corresponding sterically hindered compositions are considerably lower, preferably <9.5.

The tertiary amines, amidines and guanidines are hereby used as catalysts, while the released substituents in the mercapto-terminated polymer systems do not usually disturb, although they don't have a positive effect, either. The absorption of hydrogen in the radical may take place, for example, from the hydrogen groups of existing polymers and/or other organic compositions present. The tertiary amines or amidines or guanidines formed usually have a higher basicity than the photoinitiator and evidently act as catalysts. The higher basicity of the newly formed tertiary amines and/or amidines and/or guanidines with respect to basicity of the photoinitiator is fundamentally measurable via the pKa value of the respective conjugated acid. The higher basicity has the advantage and/or the effect that the reaction between mercaptan and epoxy composition is accelerated and the sealing compound cures particularly fast.

The last cited photoinitiators are used in the state of the art in acrylate-based UV-curable coatings. Surprisingly, in the present invention, they also initiate the reaction of the epoxy composition with mercaptan and/or they accelerate it, when the sealing compound is subject to high-energy actinic radiation, such as UV light. It was surprising that a photoinitiator which releases relatively small quantities of tertiary amine radicals and/or amidine radicals, provided sufficient quantities of tertiary amine or amidine composition with catalytic activity for curing of base masses.

The photoinitiator is in particular a photolatent DBN and/or a photolatent DBU, optionally in the presence of at least one photosensitizer such as benzophenone and/or thioxanthone. These photolatent bases release bases, which are considerably stronger than may other photoinitiators and lead therefore to a particularly effective catalysis of reaction between mercaptan-groups and the epoxy-groups.

A particularly effective deep curing of the sealing compound is also achieved, when the photoinitiator is provided as a combination of at least one photolatent, i.e. sterically hindered tertiary amine and/or amidine and/or guanidine, preferably DBN and/or DBU, and at least one non photolatent, i.e. free tertiary amine and/or amidine and/or guanidine, preferably N-methylmorpholine, 1,4-dimethylpiperazine, 2,2'-dimorpholinodiethylether, tris-(dimethylaminomethyl phenol), triethylene diamine and/or TMG, particularly preferably triethylene diamine and/or TMG.

Moreover, photosensitizers may also be used. Fundamentally, in this case any photosensitizer may be used which shifts the absorption spectrum in the desired wavelength range of the radiation to be used and in particular into the UV-A range. In fact, the UV-A range is particularly useful for larger layer thicknesses, and UV-A radiation does not cause any ozone formation. In contrast to photoinitiators, the photosensitizers shift the absorption spectrum for example from the short waves in the UV range of UV-C of 200-280 nm and UV-B of 280-315 nm to long waves in the UV range of UV-A with 315-380 nm.

Therefore, also mixtures of photosensitizers and photoinitiators may be advantageously used, in order to specifically set the absorption wavelength(s) of base mass and sealing compound by means of at least one photosensitizer. The photosensitizers used are preferably those which do not release tertiary amines as well as o amidine or guanidine, although they support the setting of the absorption wavelengths in a way, that is suitable for the respective application. Examples are mixtures selected for example from at least one photosensitizer selected from benzophenone and isopropylthioxanthone ITX with at least one photoinitiator based on sterically hindered tertiary amine such as triethylendiamine and/or based on sterically hindered guanidine such as TMG and/or based on sterically hindered amidine such as DBN and/or DBU.

The curing takes place by chemical reaction of mercapto-groups with epoxy-groups, wherein at least one hydroxy-thioether, hydroxythioethersulfide and/or hydroxysulfide is formed. Due to the cleaving of the radical from the photoinitiator, the steric hindering is omitted. Only by H-absorption, in the case of tertiary amine or emission, in the case of amidine, the radical forms the catalyst, which has a higher basicity and is no more sterically hindered.

In the inventive method, by the photoinitiator, no radical release as in the case of a radical UV curing is used, but only the formation of an amine and/or amidine and/or guanidine, which may be accompanied by the formation of a radical, without this having any effect on the curing process. The released tertiary amine or amidine or guanidine radical therefrom forms by hydrogen absorption or cession a tertiary amine or amidine or guanidine, without the need for particular measures to be taken, which is used in this case for catalytic initiation and/or catalytic acceleration of the chemical reaction between epoxy-groups and mercapto-groups during the chemical curing. The tertiary amine or amidine or guanidine formed initiates the reactions between the components of the base mass and curing agent and/or accelerates the same. It evidently can fundamentally work at lower and higher temperatures as a catalyst for curing with the at least one epoxy composition. The photoinitiator appears in this case to act as a latent catalyst. After the cleaving of the amine or amidine or guanidine radical from the photoinitiator, after formation of an amine or amidine or guanidine bond and also after catalysis of the curing process, the amine or amidine or guanidine are still free and continues to catalyze after the end of the high-energy actinic irradiation, so that, usually, even a catalytic post-curing takes place. In the catalytic post-curing, the curing of the sealing compound continues even after the end of the high-energy irradiation. This is evidently something particular with respect to curing with acrylate-based compositions.

Due to the action of the high-energy actinic radiation, the chemical reaction between base polymer and curing agent is initiated and/or accelerated by the latent catalyst. The starting of curing on demand is therefore possible. The command is issued through the high-energy actinic irradiation, such as an UV radiation. In this way, it is possible to set the instant of initiation of curing and to initiate the curing.

An actinic irradiation such as an UV irradiation may essentially last for over 1 second up to 6 hours. It preferably takes place according to the layer thickness and/or the radiation source, for a period of 1 seconds to 15 minutes, wherein, essentially, a longer irradiation time may also be used. Usually, an actinic irradiation in the range from 5 seconds to 2 minutes is sufficient, if an UV radiation dose of at least 1 $J/cm^2$ is used. If one works with an UV-LED lamp, which provides a wavelength of 365 nm, with an intensity of 0.05 to 1.5 $W/cm^2$, a radiation dose of 1 to 20 $J/cm^2$ is preferred, whereas with an intensity of 0.2 to 1.2 $W/cm^2$, a radiation dose from 3 to 16 $J/cm^2$ is preferred. If one works with an UV-LED lamp, which provides a wavelength of 395 nm, with an intensity of 0.05 to 1.5 $W/cm^2$, a radiation dose of 3 to 20 $J/cm^2$ is preferred, in particular, whereas with an intensity of 0.1 to 1.2 $W/cm^2$, a radiation dose of 6 to 17 $J/cm^2$ is preferred. If a mercury vapor lamp is used, which has a spectrum with various wavelengths, with an intensity of 0.10 to 1.5 $W/cm^2$, a radiation dose of 1 to 25 $J/cm^2$ is preferred, whereas, in particular, with an intensity of 0.20 to 1.0 $W/cm^2$, a radiation dose of 4 to 20 $J/cm^2$ is preferred.

Following table 3 again provides the mentioned relationship between the used wavelength, the radiation intensity and the radiation dose.

TABLE 3

Preferred and particularly preferred radiation intensities and doses

| UV lamp used | Radiation intensity ($W/cm^2$) | Radiation dose ($J/cm^2$) |
|---|---|---|
| UV-LED-lamp with 365 nm | 0.05-1.50 | 1-20 |
| UV-LED-lamp with 365 nm | 0.2-1.20 | 3-16 |
| UV-LED-lamp with 395 nm | 0.05-1.50 | 3-20 |
| UV-LED-lamp with 395 nm | 0.1-1.20 | 6-17 |
| Mercury vapor lamp | 0.1-1.50 | 1-25 |
| Mercury vapor lamp | 0.2-1.0 | 4-20 |

In many embodiments, after irradiation, but also without previous irradiation with a high-energy actinic radiation, a catalytic post-curing takes place, which often lasts for more than several hours or days. The catalytic post-curing may be facilitated in a particular embodiment by an additional non-sterically hindered catalyst. This catalytic post-curing therefore guarantees, regardless if, where and how much of an active catalyst is formed, that the sealing compound in use, in particular at sites which are difficult or impossible to reach by radiation, always reaches a high quality.

The high-energy actinic radiation may in particular be an UV radiation, or also, as an alternative, an electron radiation. These radiation types have been successful, since they comprise the energy range, which is required for activation of the photoinitiator, in particular UV light with UVC, UVA and/or UV/VIS radiation. To this end, at least one UV radiator such as for example at least one powerful UV radiator, preferably with a power of more than 400 W, at least one less powerful UV radiator with powers below 120 W and/or at least one UV-LED, at least one fluorescence radiator for UV radiation and/or at least one electron radiator. If the UV-A range is considered, no ozone is formed, and moreover the curing of thicker layers such as about 2 to 7 mm is feasible.

For simplification, in the following only UV light or UV radiation are mentioned, without introducing a limitation to such wavelengths. In practice, though, UV light is preferably used.

In contrast to conventional sealing compounds, without high-energy actinic irradiation and without this catalytic reaction, the inventive reaction is considerably accelerated. The initiation of the reaction by high-energy radiation may be recognized by the very fast, possibly seconds lasting, surface curing. The acceleration of the reaction may be recognized by the accelerated through-hardening.

In the inventive method, the sealing compound may have a Shore A hardness of at least 10, as measured 5 to 600 minutes after start of high-energy actinic radiation and/or Shore A hardness in the range from 30 to 60, as measured 2 weeks after starting the high-energy actinic irradiation. The significant increase of hardness takes place due to post-curing to complete through-hardening. Depending on the content of photoinitiator and of free tertiary amine or free amidine or free guanidine, the speed may be controlled: the higher this content, the faster is the curing.

Surprisingly, with the found sealing compound system the curing of larger layer thicknesses is also possible. In fact, the epoxy-mercaptan reaction is strongly accelerated by very low quantities of catalyst, in particular of a tertiary amine and/or amidine and/or guanidine, so that even low quantities of energetic actinic radiation are sufficient for releasing an amine or amidine or guanidine radicals and for forming corresponding amine, amidine or guanidine traces.

Hereby, the chemical composition of the base mass(es) as well as the chemical composition of the curing sealing compound may be selected in such a way that the energetic actinic radiation, such as an UV light, is absorbed only to a reduced extent. Usually, the main components of a base mass or sealing compound are transparent to energetic actinic radiation. In particular in the case of fillers, it has to be preferably paid attention that they possess a good transparency to the selected radiation. Electron rays usually penetrate much easier than UV light through substances of a base mass or sealing compound. It is therefore preferred, that, when adding fillers and other additives to one of the masses, those are selected that absorb little or no UV light of the selected type or that absorb little or no UV light, so that they are as transparent as possible to the selected type of radiation, by which the curing has to be initiated. They preferably have no or low absorption in the range of the UV light spectrum or of the UV light used for irradiation. Fillers usually are added to a sealing compound, in order to achieve better mechanical properties. In particular, fillers based on calcium carbonate and microscopic hollow spheres of glass or plastic should be checked, if necessary, with respect to their transparency to radiation.

It is therefore preferred, that no materials or only up to 1 wt.-% or only up to 5 wt.-% of materials such as fillers are added to the base mass and the curing agent, which exhibit, in the range of the energetic actinic radiation to be used a clear absorption or an absorption, which is clearly above the absorption of the sulfur-containing polymers of the base mass.

A further important advantage of the invention is that after starting the curing, even without irradiation by UV light, a reliable and complete curing is obtained, although only after a long time, such as after 1 to 21 days. This is important for applications, in which the sealing compound is introduced in cavities and/or gaps between components and/or is shielded in any other way against UV light, for example. In particular, in the production of aircraft, it is important that for each application a possibly complete curing of the entire base mass introduced with the curing agent is obtained.

The inventive base mass or sealing compound contains at least one sulfur-containing mercapto-terminated base polymer based on polyether, polythioether, polysulfide, copolymers thereof and/or mixtures thereof.

A base mass based on polythioether with terminal mercapto-groups and possibly polysulfide with terminal mercapto-groups is particularly preferred.

According to a preferred embodiment, the base mass is essentially based on at least one liquid polythioether composition, which carries at the ends of molecule a respective mercapto-group. The polythioether may in particular contain possibly up to about 50 mol % of disulfide groups within the molecule. These may then be also called polythioethersulfides. Preferred compounds of this kind are described in WO 2015/014876 A2 and have the following structure.

Formula III: Polythioethersulfide of WO 2015/014876 A2

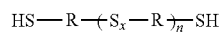

X=1.0-1.5
R=—$(CH_2)_p$—O—$(CH_2)_q$—O—$(CH_2)_r$—, 0-20% of the R groups can also carry branched alkanediyl or arenediyl groups.
n=1-60
q, p, r=1-10

According to a further preferred embodiment, in the base mass, in addition to the at least one liquid polythioether compound, at least one disulfide-containing compound such as at least one polysulfide is contained in a proportion to the base mass of up to 80 wt.-%.

The mercapto-terminated polythioether polymers and/or polythioether sulfide is polymers are applied in the inventive compositions of the base mass and of the sealing compound produced therewith are preferably liquid polymers with a molecular weight, in particular in the range from 500 to 6000 g/mol, particularly preferably with a molecular weight in the range from 900 to 5000 g/mol. These mercapto-terminated polythioether polymers and/or polythioether sulfide polymers may be one- or multiple branched molecules.

As the mercapto-terminated polysulfide polymers used in the inventive compositions of the base mass and of the sealing compound produced therewith preferably long-chain polymers with a molecular weight in particular in the range from 2500 to 6000 g/mol such as Thioplast® G131 are used, particularly preferably with a molecular weight in the range from 3300 to 5000 g/mol such as Thioplast® G10, Thioplast® G12, Thiokol® LP 32 and/or Thiokol® LP 12. Also, these mercapto-terminated polysulfide polymers may be one or multiple branched molecules.

As the mercapto-terminated polysulfide polymers in the inventive compositions of the base mass, sealing compound and the sealing compound produced therewith, optionally additionally, short chain polymers with a molecular weight in particular in the range from 500 to 2500 g/mol, particularly preferably in the range from 700 to 2000 g/mol and most preferably in the range from 800 to 1200 g/mol, such as Thiokol® LP3, Thioplast® G4, Thioplast® G22 or Thioplast® G44 are used.

In a preferred embodiment, as mercapto-terminated polysulfide polymers and/or mercapto-terminated polythioether and/or mercapto-terminated polythioethersulfide in the inventive compositions of the base mass, the sealing compound and the sealing compound produced therewith, preferably, on one side, long-chain polymers with a molecular weight in particular in the range from 2500 to 6000 g/mol, particularly preferably in the range from 3300 to 5000 g/mol and, on the other hand, short chain polymers with a molecular weight in particular in the range from 500 to 2500 g/mol, particularly preferably in the range from 800 to 1500 g/mol are used, wherein the ratio of the long-chain polymers to the short chain polymers preferably lies in the range of 25:1 to 0.5:1, from 20:1 to 2:1 or from 14:1 to 8:1.

In the inventive compositions of the base mass and the sealing compound obtained therewith the mercapto-terminated polyether polymers preferably are liquid polymers with a molecular weight in particular in the range from 100 to 7000 g/mol or from 500 to 6000 g/mol, particularly preferably with a molecular weight in the range from 1000 to 3000 g/mol, which are correspondingly also present in the sealing compound produced therewith.

The molecular weight may be determined through GPC (gel permeation chromatography) against polystyrene standards and/or polyethylene standards. Herein, the molecules of the polymer specimen are separated according to their molecular weight in a plurality of successive columns which are filled with porous material, and are identified for example by means of a refraction index detector, viscosity detector and/or light scattering detector. THF (tetrahydrofurane) may be used, for example, as a mobile phase.

However, the molecular weight may also be determined through NMR spectroscopy (nuclear magnetic resonance spectroscopy).

The sulfur containing base polymers preferably have a mercaptan content referred to reactive SH groups with respect to the entire base polymer in the range from 0.5 to 10 wt. %, from 0.8 to 8 wt. % or from 1.2 to 7 wt. %.

The mercaptan content of polymers may be determined by direct titration of the SH-terminated polymers with an iodine solution. To this end, the polymers are dissolved in a solvent mixture composed of 40% in volume of pyridine and 60% in volume of benzene, and are titrated by stirring with a benzenic iodine solution, until a weak yellow coloration remains.

The sulfur containing base polymers preferably have a total sulfur content in the range from 1 to 50 wt. %, from 5 to 45 wt. % or from 12 to 36 wt. %.

Preferably, the sulfur containing base polymers have an average functionality as reactive end groups of mercapto-groups per molecule in the range from 1.5 to 2.5 or from 1.9 to 2.2.

The functionality indicates the average number of mercapto groups per molecule. It is calculated as the ratio of molecular weight to equivalent weight and may be determined by NMR.

Preferably, the sulfur-containing base polymers have an average glass transition temperature $T_g$ in the range from −80 to −30° C. or −60 to −40° C., measured according to the AITM 1-0003 Airbus Industrie Test Method, June 1995.

An increase in sulfur content improves fuel resistance. The base polymer and/or the respective composition containing base polymer as the base composition and/or sealing compound, may contain, in addition to mercapto-terminated polymers/copolymers optionally also 0 or 0.001 to 10 or 0.01 to 5 wt.-%, of their oligomers, in particular those selected from the short-chain organic sulfides and/or from the short-chain organic thioethers. These short-chain molecules may contribute to a crosslinking and/or change in viscosity of the base polymer.

The inventive composition is either a base mass, wherein the curing agent is still to be admixed, or a one component sealing compound, in which the base mass is mixed with a curing agent, wherein the one component composition may be preferably frozen for a long storage time. The main component of the sealing compound system or the composition is a system of at least two components composed of an uncured base mass and an epoxy-based curing agent and the one component sealing compound or sealing compound produced therewith by admixing. All base masses or sealant compounds contain at least one type of mercapto-terminated base polymer. They preferably respectively contain at least one mercapto-terminated base polymer based on polysulfide, a mercapto-terminated polymer based on polythioether and/or one mercapto-terminated base polymer based on polysulfide and polythioether, which may be also present as a polymer mixture and/or copolymer, such as a block copolymer. The sealing compound system, the uncured base mass, the curing agent and/or the sealing compound are characterized in that it/they contain at least one photoinitiator, which releases and/or forms tertiary amine and/or amidine and/or guanidine, and that the released and/or formed amine or amidine or guanidine catalyzes the curing with a curing agent containing at least one epoxy compound.

It is preferred that the base mass and/or sealing compound is/are free of:
(meth)acrylate based compounds/polymers,
metal based catalysts,
all further types of polyenes, organic polymers and organic copolymers with double bonds with the exception of silanes such as vinyl silanes, acryl silanes and methacryl silanes,
vinyl containing polymers/copolymers,
more than 5 wt. % of silane/siloxane-terminated base polymers,
UV-light strong-absorbing substances such as UV light absorbing pigments, such as $TiO_2$, for example.

According to the embodiment, the base masses and/or sealing compounds may be free of all or several of above contents and additives.

The curing agent in this new sealing compound system is epoxy-based and usually free of manganese-oxide, inorganic and organic peroxide, vinyl compounds and isocyanates, if no co-curing is required. This holds also true in particular when only the at least one epoxy compound is used as curing reagent. In case of co-curing it may be however reasonable if at the same time at least one further of these curing reagents selected from manganese oxide, inorganic and organic peroxide, vinyl compound and isocyanate is used with the at least one epoxy compound, in particular by simultaneous use of epoxy with isocyanate or epoxy with manganese oxide. The epoxy compounds are preferably only added to the curing agent. The curing of the sealing compound therefore takes place with at least one epoxy-based compound.

In the following, the at least one epoxy based compound is indicated, partially undifferentiated, as "epoxy compound," whether it refers to monomers, oligomers, polymers and/or copolymers. In the sense of the present application, the term "epoxy compound" respectively refers at least to one aliphatic, and/or aromatic epoxy compound, which is mono-functional and/or multifunctional and is based on a monomer, oligomer, and/or polymer. Hereby, at least one of such epoxy based compounds is selected from this group. The term "epoxy compound" also comprises general epoxy groups.

All these epoxy compounds are preferably mixable with each other, since they all are liquid. Among these epoxy resins solid epoxy resins exist, which are solid also at room temperature, which may be melted, and which may be "dissolved" in the liquid epoxy resin and/or reagent thinner. Epoxy is used as a reaction partner in particular for mercapto groups of the base polymers. Through selection of the epoxy compound or compounds, the curing conditions and the mechanical properties of the sealing compounds are considerably influenced.

The curing agent contains at least one epoxy-based compound. The epoxy compound is used as a curing agent. The curing agent preferably contains at least one epoxy compound with a total content of epoxy-based compounds in the range from 5 to 100, 30 to 98, 40 to 95, 50 to 90 wt.-%, from 60 to 85 or of 70 to 80 wt.-%. Herein it is possible to apply the entire desired amount of epoxy compound in the form of epoxy-terminated compounds.

Herein, the epoxy groups of the epoxy compound will chemically react with the mercapto groups in particular of the base polymer and optionally also with a small number of other compounds with mercaptan base, such as with mercaptopropyl trimethoxysilane. Such a compound can in particular be added in a content of 0.1 to 5 wt.-% to the base material or the sealing compound, to adjust the mechanical properties and adhesion.

Although the functionality of the epoxy compound may generally range from 2 to 5, usually a mixture of different functionalities is present. Preferably, the functionality of the curing agent used as the at least one epoxy averages in the range from 2.0 to 3.0 or 2.2 to 2.8. The epoxy compound is preferably at least one aliphatic and/or aromatic epoxy compound, each independently averaging 2 to 3 epoxy groups per molecule.

The epoxy compound is particularly preferably added to the curing agent in the form of diglycidyl ethers of bisphenol A, diglycidyl ethers of bisphenol F and aliphatic polyglycol and/or hydantoin epoxy derivatives. Also, epoxy-terminated polythioether or polythioethersulfide and/or epoxidized polysulfides may be added. Particularly preferred is also at least one epoxy-novolac resin, preferably a cross-linked epoxy novolac resin. It is also possible that the epoxy compound is based on several of the abovementioned classes, for example, bisphenol A/F epoxy resin or bisphenol F novolac resin. So-called reagent diluters (epoxy-terminated, mono- and/or multifunctional) can be combined with any of the above-mentioned epoxy resins in order to adjust the viscosity and flexibility, for example. Examples of reagent diluters are 1, 4-butanediol diglycidyl ether, 2-ethyl-hexyl-glycidyl ether, 1,6-hexanediol diglycidyl ether. In general, all epoxy resins can be combined with each other, depending on the desired property profile, and be used as a curing agent for the mercapto-terminated base polymer.

In a preferred embodiment, the curing agent comprises, as a chemical basis, at least one epoxy-terminated polysulfide polymer and/or polythioether polymer and/or polythioethersulfide polymer without a terminal mercapto groups, which serves as a curing agent and not as a base polymer. This polymer is preferably present as a liquid or highly viscous polymer with an epoxy equivalent weight in particular in the range from 200 to 800 g/eq.

In this case, it was surprisingly found that in particular Epoxy compounds based on epoxy novolac resins such as DEN 431, DEN 438, DEN 439 and/or based on bisphenol A epoxy resins and/or bisphenol F epoxy resins, such as DER 354, DER 331, each in combination with a photoinitiator according to the invention are particularly suitable for curing in particular mercapto-terminated polymers by UV light.

Preferably, the epoxy equivalent weight of the epoxy compound used as a curing agent lies in the range from 120 to 700 g/eq, particularly preferably in the range from 140 to 400 g/eq, and most preferably in the range from 170 to 250 g/eq. An epoxy-terminated polysulfide polymer and/or polythioether polymer and/or polythioethersulfide polymer without terminal mercapto-groups has an epoxy equivalent weight in particular in the range from 200 to 800 g/eq.

Most particularly preferred are epoxy compounds based on bisphenol A epoxy resins having an epoxy equivalent weight in the range from 170 to 200 g/eq, based on bisphenol F resin having an epoxy equivalent weight in the range from 150 to 180 g/eq and based on epoxy novolac resins having an epoxy equivalent weight in the range from 160 to 220 g/eq. Depending on the desired properties and concrete application, however, all epoxy resins can be used.

The following epoxy compounds are particularly preferred:
1) bisphenol F epoxy resins such as DEN 354 (Olin Epoxy)
2) bisphenol A resins such as DER 336, DER 331 (Olin Epoxy)
3) bisphenol A/F epoxy resins such as DER 351, DER 324, DER 335 (Olin Epoxy).
4) epoxy novolac resins such as DEN 431, DEN 438, DEN 439 (Olin Epoxy),
5) epoxy-terminated prepolymers based on polysulfide and/or polythioether such as Thioplast EPS 25 (Akzo Nobel) and
6) epoxy-terminated reactive diluent based on alcohol/glycols such as 1,4-butanediol diglycidyl ether (DER 731; Olin Epoxy), 1,6-hexanediol diglycidyl ether (DER 734; Olin Epoxy), 2-ethylhexyl diglycidyl ether (DER 728; Olin Epoxy), $C_{12}$-$C_{14}$ glycidyl ether (DER 721; Olin Epoxy).

Herein it may be important, when using an epoxy-terminated compound, that a molar excess of epoxy compound in the range from 1.05 to 2 compared to 1 mole of reactive SH-groups is added with respect to the total content of mercapto-terminated base polymer.

The epoxy compound may have an epoxy equivalent weight in the range from 120 to 700 g/eq, in the range from 140 to 400 g/eq or from 160 to 250 g/eq.

Preferably all components of the base polymer of the base mass and all epoxy-based compounds of the curing agent are liquid at room temperature, are highly viscous liquids/pastes and/or are substances, which are dissolved in an organic solvent. This improves the homogeneous miscibility of these components.

Additives such as silanes may be added to the curing agent. However, it is preferred that the curing agent not contain any cycloaliphatic epoxy resin such as hydrogenated bisphenol A diglycidyl ether, hydrogenated bisphenol A diglycidyl ether oligomers, hydrogenated bisphenol F diglycidyl ether, hydrogenated bisphenol F diglycidyl ether oligomers and 3,4-epoxycyclohexylmethyl-3,4-epoxycyclohexyl carboxylate. The curing agent may be free or substantially free of water. It is often free of plasticizers.

Preferably the base mass and/or sealing compound contains at least one additive selected from the group consisting of photosensitizers, fillers, light fillers, thixotropic agents, plasticizers, adhesion promoters, ageing inhibitors, flame retardants, crosslinking agents, resins and organic solvents.

Because of the reaction(s) between the epoxy compound and the mercapto groups of the base polymer, a network based on hydroxythioethers and/or hydroxythioether sulfides and/or hydroxysulfides is formed, which forms the cured sealing compound.

The object is also achieved by a sealing compound system and/or a sealing compound composed of an uncured base composition based on sulfur-containing polymers and a curing agent containing at least one epoxy compound for the preparation and curing of a sealing compound, wherein the uncured base mass contains one mercapto-terminated polymer based on polyether, polythioether, polysulfide, polythioethersulfide, copolymers thereof and/or mixtures thereof, wherein the uncured base mass, the curing agent or both contain a photoinitiator that can be activated upon exposure to high-energy actinic radiation and may release an amine and/or an amidine and/or guanidine radical, that, after forming an amine or amidine or guanidine compound, may act or acts as a catalyst for the curing, and wherein the mixture of base mass and curing agent, which together form the sealing compound may cure, starting from the application of the high-energy actinic radiation, the release of one amine and/or amidine and/or guanidine radical and/or the formation of an amine and/or amidine and/or amidine compound, and which is defined as sealing compound with the starting of curing. The sealing compound system defines the system composed of uncured base mass, curing agent and sealing compound. The compositions, the properties, the methods and the effects of the sealing compound system are therefore the same as in the uncured base mass, the curing agent and the sealing compound; their further description is therefore omitted.

The object is also achieved by an uncured base mass, in particular for curing by command ("on demand"), based on sulfur containing polymers, for producing a sealing compound, which is characterized in that the uncured base mass contains a mercapto-terminated base polymer based on polyether, polythioether, polythiosulfide, polysulfide, copolymers thereof and/or mixtures thereof, as well as a photoinitiator and that the photoinitiator is activated upon application of high-energy actinic radiation, in order to form, after release of an amine and/or amidine and/or guanidine radical, a catalyst in the form of a tertiary amine or amidine or guanidine compound, which catalyzes the reaction between mercapto-terminated base polymer and epoxy based curing agent.

The uncured sealing compound, prepared for curing on demand, is characterized in that it contains a mixture of an uncured base mass and a curing agent with a content of at least one epoxy compound, that the base mass contains a photoinitiator, which may be activated upon application of high-energy actinic radiation, and may release an amine and/or amidine and/or guanidine radical, which, after formation of an amine, amidine or guanidine compound, acts as a catalyst for curing, and that the base mass cures after starting the application of high-energy actinic radiation, the release of an amine and/or amidine and/or guanidine radical and formation of an amine, amidine or guanidine compound. Following the application of high-energy actinic radiation, the sealing compound curing accelerates.

The object is also achieved by a curing agent for preparation of a sealing compound based on sulfur containing polymers, which is characterized in that the curing agent has a content of at least one epoxy compound as well as at least one photoinitiator, and that at least one photoinitiator may be activated upon application of high-energy actinic radiation and may release and/or form an amine and/or amidine and/or guanidine, which may act and/or acts as a catalyst for the curing of a mercapto-terminated base polymers with a curing agent containing an epoxy compound.

In the inventive sealing compound system, in the inventive sealing compound the curing of the uncured sealing compound is started and/or accelerated by irradiation with a high-energy actinic radiation.

The object is also achieved with a curing agent, which contains sulfur containing polymers with a backbone based on 1) polythioether, 2) polysulfide, 3) polythioethersulfide, 4) copolymers with a percentage of polythioether and/or polysulfide and/or 5) mixtures thereof, wherein these polymers are epoxy-terminated.

The object is also achieved by an aircraft containing components, which are coated and/or sealed by using an inventive sealing compound system and/or sealing compound and/or method.

The inventive base masses and/or sealing compounds may, if necessary, additionally contain at least a respective one of following additives:

Mixtures of photosensitizers and/or photoinitiators are advantageously used for specifically adjusting the absorption wavelength(s) of the sealing compound. The photosensitizer may shift the absorption edge and/or the absorption range of the chemical system (sterically hindered tertiary amine and/or amidine and/or guanidine).

Fillers, in particular, those based on magnesium silicate hydrate such as talc, based on aluminum such as $Al(OH)_3$, based on a feldspar, on quartz flour and/or based on calcium and/or aluminum silicate, particularly preferably at least one filler with a particle size predominantly in the range from 1 to 20 μm. The addition of a filler facilitates the improvement of the mechanical properties. Fillers suitable for UV irradiation have been proved to be calcium silicate, magnesium silicate, aluminum silicate, quartz and/or aluminum hydroxide such as aluminum trihydrate. Less suitable for the inventive base mass and sealing compound are fillers based on $CaCO_3$, $TiO_2$, carbon black and/or $BaSO_4$ and fillers with a significant iron content and/or content of other heavy metals.

Light fillers, in particular based on polyurethane, including their copolymers, polyamide wax and/or polyolefin wax. Lightweight fillers also reduce the density. Alternatively, or additionally, hollow filling bodies may also be used.

Thixotropic agents, in particular on the basis of feldspar, silica, sepiolite and/or bentonite. Thixotropic agents are used for adapting the rheological properties, in particular for achieving a thixotropic behavior, in order to firmly apply a sealing compound.

Plasticizers, in particular those based on an adipate, a benzoate, a citrate, a phthalate, and/or a terphenyl. Plasticizers are used for rendering flexible a sealing compound. Plasticizers may often be omitted. For flexibilization, also epoxy-terminated reactive diluents may be used.

Adhesion promoters, in particular those based on a phenolic resin, a resole, and/or a silane/silanol/siloxane, —here abbreviated to "silanes,"—such as those based on organic functional alkoxysilane, such as mercaptopropyltrimethoxysilane, mercaptopropyl, glycidoxypropyl trimethoxysilane, glycidoxypropyl triethoxysilane, methacryloyloxymethyl trimethoxysilane and/or (methacryloxymethyl) me-thyldimethoxysilan, and/or a bis-silyl-silane. Adhesion agents are used as an adhesion promoter to improve the adhesion between the sealing compound and the substrate. If adhesion promoters carrying epoxy groups, such as glycidoxypropyl trimethoxysilan and glycidoxypropyl are used, they must be used in the curing agent component, as otherwise a premature reaction between the SH groups of the base polymer and the epoxy would occur.

Anti-ageing agents are used, in particular those based on sterically hindered phenol, based on phenyleneamine and/or as so-called hindered amine light stabilizer (HALS) such as light stabilizers based on sterically hindered amines, for example 4,6-bis(dodecylthiomethyl)-o-cresol, ethylene-bis (oxyethylene)bis-(3-(5-tert-butyl-4-hydroxy-m-tolyl) propionate, thiodiethylene bis[3-(3,5-di-tert-butyl-4-hydroxyphenyl)propionate], pentaerythritol tetrakis (3-(3,5-di-tert-butyl-4-hydroxyphenyl) propionate) and/or phenylenamine such as N-Isopopyl-N'-phenyl-p-phenylenediamine. Anti-ageing agents are used to capture radicals formed as a result of aging processes in the polymer base mass and/or other cleaving products and contribute to delaying or preventing of aging such as a yellowing or increased brittleness of the sealing compound.

Crosslinking agents based in particular on (SH-terminated) mercaptans (e.g. derivatives of mercapto-carboxylic acid by Bruno Bock/THIOCURE®) that preferably contribute to a further improvement of the mechanical properties.

Flame retardants, in particular those based on phosphoric acid ester, based on ammonium polyphosphate, based on melamine, based on aluminum hydroxide and/or based on magnesium hydroxide. Flame retardants are used to improve the fireproofing of the sealing compound such as delaying the start of combustion of the sealing compound, the spontaneous termination of the combustion and/or the reduction of smoke release.

And/or at least one organic solvent, in particular one based on ester and/or ether, such as ethyl acetate and/or monopropylene glycol monomethyl-ether. They possibly simplify the homogenization of the liquid or viscous mixture. In most cases, however, solvents may be omitted.

Preferably, the inventive composition of the base mass contains:

A base polymer with a content in the range from 30 to 98 wt.-%, preferably in the range from 40 to 95 wt.-%, 45 to 90 wt.-%, 50 to 85 wt.-%, 55 to 80 wt.-% or in the range from 60 to 75 wt.-% of at least one mercapto-terminated polymer/copolymer, optionally including a content of monomers and/or oligomers of 0 or in the range from 0.001 to 20 wt.-%, which can make up 0 or 0.001 to 10 wt.-% of the base polymer;

Optionally at least one plasticizer with a total content of 0 wt.-% or in the range from 0.1 to 30 wt.-%, from 2 to 20 wt.-%, from 5 to 15 wt.-% or from 6 to 10 wt.-%. Optionally at least one filler is present with a total content of 0 wt.-% or in the range from 0.1 to 50 wt.-%, 2 to 40 wt.-%, 5 to 30 wt.-%, 10 to 20 wt.-% or from 6 to 15 wt.-%.

Optionally at least one light filler with a total content of 0 wt.-% or in the range from 0.1 to 30 wt.-%, from 3 to 25 wt.-%, from 5 to 20 wt.-%, or from 8 to 15 wt.-%.

Optionally, at least one thixotropic agent, with a total content of 0 wt.-% or in the range from 0.01 to 30 wt.-%, from 0.01 to 10 wt.-%, from 0.2 to 25 wt.-%, from 0.5 to 20 wt.-%, from 1 to 15 wt.-%, from 0.5 to 8 wt.-% or from 1.5 to 5 wt.-%, wherein, in principle, even amounts higher than 10 wt.-% are possible, particularly when the thixotropic agent also serves as a filler and is sufficiently transparent to the high-energy actinic radiation, wherein, in this case, regarding its content, it is only considered as a thixotropic agent.

Optionally, at least one photoinitiator, which can release a radical based on tertiary amine and/or amidine and/or guanidine, with a total content of 0 wt.-% or from 0.05 to 5 wt.-%, or 0.1 to 4 wt.-%, or 0.3 to 3 wt.-%, or 0.6 to 2 wt.-%.

Optionally at least one photosensitizer, which can shift the absorption spectrum of the sealing compound formulation, with a total content of 0 wt.-% or in the range from 0.05 to 5 wt.-%, from 0.1 to 4 wt.-%, or from 0.3 to 3 wt.-% or from 0.6 to 2 wt.-%.

Optionally at least one adhesion promoter, having a total content of 0 wt.-% or in the range from 0.1 to 10 wt.-%, from 0.3 to 8 wt.-%, from 0.6 to 6 wt.-%, or from 1 to 5 wt.-%, from 2 to 4 wt.-% or from 1.5 to 3 wt.-%.

Optionally at least one anti-aging agent with a total content of 0 wt.-% or in the range from 0.5 to 2.5 wt. % or from 0.5 to 1.5 wt.-%.

Optionally, at least one flame retardant having a total content of 0 wt.-% or in the range from 0.5 to 40 wt.-%, or from 0.5 to 10 wt.-%.

Optionally, at least one crosslinking agent, in particular based on mercaptans (such as derivatives of mercaptocarboxylic acid by Bruno Bock/THIOCURE®) that preferably facilitates an improvement of mechanical properties, with a total content of 0 wt.-% or in the range from 0.1 to 10 wt.-%, or from 0.5 to 6 wt.-%.

And optionally at least one organic solvent based on an ester and/or ether, with a total content of 0 wt.-% or in the range from 0.1 to 15 wt.-% or from 2 to 10 wt.-%.

A homogeneous mixture of the base mass can be achieved for example by using a vacuum dissolver.

Preferably, the curing agent according to the invention contains:

At least one epoxy compound having a total content in the range from 20 to 100, 30 to 98, 40 to 95, 50 to 90 wt.-%, from 60 to 85 or 70 to 80 wt.-%.

Optionally at least one photoinitiator which may release a radical based on a tertiary amine and/or amidine and/or guanidine, with a total content of 0 wt.-% or in the range from 1 to 90 wt.-%, in the range from 2 to 50 wt.-% or in the range from 3 to 20 wt.-%.

Optionally at least one photosensitizer with a total content of 0 wt.-% or in the range from 1 to 90 wt.-% or in the range from 2 to 50 wt.-% or in the range from 3 to 20 wt.-%.

Optionally, at least one thixotropic agent, with a total content of 0 wt.-% or in the range from 0.01 to 10 wt.-% or from 0.5 to 5 wt.-%. In addition, it may be advantageous if the curing agent also contains a thixotropic agent such as on the basis of pyrogenic silica, as this has proven to be a particularly convenient means for regulating the flow properties of the curing agent.

And optionally at least one organic solvent based on an ester and/or ether, with a total content of 0 wt.-% or in the range from 0.1 to 15 wt.-% or from 2 to 10 wt.-%.

A homogeneous mixture of the curing agent can be achieved for example by use of a vacuum dissolver.

Preferably, the Inventive Composition of the Sealing Compound Contains:

At least one base polymer with a content in the range from 20 to 97 wt.-% prior to the crosslinking reaction with the epoxy compound-based curing agent, preferably in the range from 40 to 95 wt.-%, 45 to 90 wt.-%, 50 to 85 wt.-%, 55 to 80 wt.-% or in the range from 60 to 75 wt.-% of at least one mercapto-terminated polymer.

At least one base polymer with a content in the range from 20 to 97 wt.-% after the crosslinking reaction with the epoxy compound-based curing agent, preferably in the range from 40 to 95 wt.-%, 45 to 90 wt.-%, from 50 to 85% wt.-%, 55 to 80 wt.-% or in the range from 60 to 75 wt.-%, which, after the crosslinking reaction with epoxy, is a polymer/copolymer based on hydroxythioether, hydroxysulfide and/or hydroxythioethersulfide.

At least one photoinitiator, capable of releasing a radical based on a tertiary amine and/or amidine and/or guanidine, in the range from 0.05 to 5 wt.-%, 0.1 to 4 wt.-%, 0.3 to 3 wt.-%, or 0.6 to 2 wt.-% and/or the radicals and/or the compounds formed therefrom a short time thereafter, having a total content of 0 wt.-% or in the range from 0.05 to 5 wt.-%, from 0.1 to 4 wt.-%, 0.3 to 3 wt.-% or 0.6 to 2 wt.-%.

Optionally at least one photosensitizer with a total content of 0 wt.-% or in the range from 0.05 to 5 wt.-%, from 0.1 to 4 wt.-%, 0.3 to 3 wt.-% or from 0.6 to 2 wt.-%.

At least one epoxy compound having a total content in the range from 1 to 40, 3 to 30, 5 to 25, 7 to 20 wt.-%, 8 to 18 or 9 to 16 wt.-%.

Optionally at least one filler with a total content of 0 wt.-% or in the range from 0.1 to 50 wt.-%, 2 to 40 wt.-%, 5 to 30 wt.-%, 10 to 20 wt.-% or 6-15 wt.-%.

Optionally at least one light filler with a total content of 0 wt.-% or in the range from 0.1 to 30 wt.-%, from 3 to 25 wt.-%, from 5 to 20 wt.-%, or from 8 to 15 wt.-%.

Optionally, at least one thixotropic agent, with a total content of 0 wt.-% or in the range from 0.01 to 30 wt.-%, 0.01 to 10 wt.-%, 0.2 to 25 wt.-%, 0.5 to 20 wt.-%, 1 to 15 wt.-%, from 0.5 to 8 wt.-% or from 1.5 to 5 wt.-%, wherein, in principle, contents larger than 10 wt.-% are possible, particularly if the thixotropic agent also has filler properties and is sufficiently transparent to the high-energy actinic radiation, wherein, in this case, with respect to its content, it will only be counted as a thixotropic agent.

Optionally at least one plasticizer having a total content of 0 wt.-% or in the range from 0.1 to 30 wt.-%, 2 to 20 wt.-%, from 5 to 15 wt.-%, or from 6 to 10 wt.-%.

Optionally at least one adhesion promoter having a total content of 0 wt.-% or in the range from 0.1 to 10 wt.-%, from 0.3 to 8 wt.-%, from 0.6 to 6 wt.-%, 1 to 5 wt.-%, from 2 to 4 wt.-% or from 1.5 to 3 wt.-%.

Optionally at least one anti-aging agent with a total content of 0 wt.-% or in the range from 0.5 to 2.5 wt. % or from 0.5 to 1.5 wt.-%.

And optionally at least one organic solvent based on an ester and/or ether, with a total content of 0 wt.-% or in the range from 0.1 to 15 wt.-% or from 2 to 10 wt.-%.

A homogeneous mixture of the sealing compound can be achieved for example by using a Techkit cartridge mixer or a static mixer ("Side by Side" or "bulk mixer").

The weight ratio of mercapto-terminated base polymer to epoxy based compounds in the curing agent, without taking into account the contents of further compounds of the respective compositions preferably lies in the range from 100:3 to 100:50, more preferably in the range from 100:4 to 100:25, from 100:5 to 100:15 or from 100:6 to 100:12.

For curing, the base mass and curing agent in the inventive sealing compound system are mixed in a way that the epoxy groups of the curing agent are present in a superstoichiometric quantity with respect to the mercapto-groups of the base mass (the base polymer). The excess of epoxy groups in this case is preferably from 1 to 80 mol %, particularly preferably 5 to 50 mol % and very particularly preferably 10 to 30 mol %.

The weight ratio of base mass to epoxy-based curing agent lies, in consideration of the contents of further compounds of the respective compositions, preferably in the range from 100:3 to 100:30, more preferably in the range from 100:4 to 100:25, 100:5 to 100:15 or from 100:6 to 100:12.

The molecular weight ratio of the base mass to the epoxy-based curing agent lies, in consideration of the further contents of the respective compositions, preferably in the range from 0.6:1 to 5:1, more preferably in the range from 0.8:1 to 4:1, from 0.9:1 to 3:1 or from 1:1 to 2:1.

The weight ratio of mercapto-terminated base polymer to photoinitiator lies, without considering other contents of the respective compositions, preferably, in the range from 100: 0.1 to 100:5, more preferably in the range from 100:0.5 to 100:4, 100:0.8 to 100:3, or from 100:1 to 100:2.

The molecular weight ratio of mercapto groups to epoxy groups is without regard to other contents and groups of the respective compositions are preferably in the range from 1:0.8 to 1:2, more preferably in the range from 1:0.9 to 1:1.5, of 1:0.95 to 1:1.3, or from 1:0.98 to 1:1.2.

Preferably, the inventive sealing compound and the inventive sealing compound system comprise a mercapto-terminated base polymer based on polyethers, polythioethers, polythioethersulfide, polysulfide, copolymers and/or mixtures thereof, at least one photoinitiator based on sterically hindered tertiary amine and/or sterically hindered amidine and/or sterically hindered guanidine and at least one epoxy compound and optionally at least one additive. The at least one additive may preferably be at least one selected from the group consisting of photosensitizers, fillers, light fillers, thixotropic agents, plasticizers, adhesion promoters, antiageing agents, flame retardants, crosslinking agents, resins and organic solvents. Preferably, as a filler, hydrated magnesium silicate, aluminum silicate containing aluminum such as aluminum trihydrate and/or calcium are contained. A part of these main components, and optionally also a part of these additives may also be included in the base mass and/or in the curing agent.

The Compounds of the Invention Preferably have the Following Properties:

The base masses and sealing compounds of the invention usually have most if not all of the following properties:

The dynamic viscosity of the base masses and sealing compounds of the invention is preferably between 1 and 2500 Pas, or between 10 to 1800 Pa·s according to DIN 65262-1, measured with a Brookfield viscometer at 23° C., with spindle 7, at 2 to 10 rpm.

The UV irradiation is preferably performed depending on the layer thickness and/or UV source over a period of 1 s to 5 minutes, preferably 5 s to 3 minutes, or 10 s to 1 minute. The tack-free time of the sealing compound, determined according to DIN 65262-1 is preferably in the range from 1 s to 10 minutes, in particular depending on the layer thickness, and is often in the range from 0.3 to 5 minutes or from 1 to 3 minutes, after UV irradiation.

A processing time of the uncured sealing compounds determined according to DIN 65262-1 is preferably in the range from 0.5 to 24 hours—among other things depending on the photoinitiator amount of the base mass to be irradiated, particularly preferably in the range from 0.5 to 6, or 0.5 to 2 hours.

A sealing compound that is produced by the inventive process, preferably has/had a tack free time—especially depending also on the photoinitiator concentration—according to DIN 65262-1, in the range from 0.05 to 10 minutes after the high-energy actinic radiation.

The through-hardening time or the time to reach Shore A hardness of 30 determined according to ISO 7619-1 in the sealing compounds according to the invention preferably lies—among other things depending on the photoinitiator amount and/or layer thickness—in the range from 1 to 960 min, preferably in the range from 5 to 300 min, more preferably in the range from 10 to 90 min.

The density of the base masses and sealing compounds according to the invention determined according to ISO 2781 is preferably in the range from 0.9 to 1.6 g/cm$^3$ and often in the range from 1.0 to 1.5 g/cm$^3$.

The sealing compounds according to the invention preferably have a Shore A hardness determined according to ISO 7619-1 and measured 2 weeks after UV irradiation with storage in air at 23±2° C. and 50±5% relative humidity, in the range from 20 to 80, particularly preferably in the range from 30 to 60, particularly preferably in the range from 40 to 55.

Elongation at rupture of the sealing masses according to the invention determined according to ISO 37 and measured 2 weeks after UV irradiation when stored in air at 23±2° C. and with 50±5% relative humidity is preferably in the range from 100 to 1000%, more preferably in the range from 200 to 800% or from 300 to 600%.

The elongation at rupture of the sealing masses according to the invention determined according to ISO 37, and measured after 168 hours at 60° C. with fuel storage of fuel type Jet A1 is preferably in the range from 100 to 800%, particularly preferably in the range from 200 to 600% or from 300 to 500%.

The elongation at rupture of the sealing masses according to the invention determined according to ISO 37, and measured after 300 hours at 100° C. with fuel storage of fuel type Jet A1 is preferably in the range from 100 to 700%, particularly preferably in the range from 200 to 600% or from 300 to 500%.

The elongation at rupture of the sealing masses according to the invention determined according to ISO 37 and measured after 1000 hours at 35° C. by water immersion is preferably in the range from 100 to 700%, particularly preferably in the range from 200 to 500% or from 250 to 350%.

The peeling resistance of the sealing compounds of the present invention on aluminum alloy 2024 T3, determined according to DIN 65262-1, is preferably in the range from 60 to 350 N/25 mm, more preferably in the range from 100 to 250 N/25 mm or from 150 to 200 N/25 mm.

The peeling resistance of the sealing compositions on paints, such as on solvent containing basecoats such as the epoxy base coat 37035 A (Akzo Nobel Aerospace Coatings), on aqueous base coatings, such as those based on epoxy such as Seevenax® 313-01 and Seevenax® 313-02 (Mankiewicz), finish coatings such as aqueous epoxy top-coatings such as Seevenax® 311-03 (Mankiewicz), on Finish F 70-A (Mapaero) and/or solvent-based top-coatings based on polyurethane such as Aerodur® C21-100 (Akzo Nobel) and ALEXIT® 406-22 (Mankiewicz) determined according to DIN 65262-1 is preferably in the range from 50 to 350 N/25 mm, preferably in the range from 100 to 300 N/25 mm or 150 to 200 N/25 mm.

The tensile resistance of the sealing masses according to the invention determined according to ISO 37 and measured 2 weeks after UV irradiation when stored in air at 23±2° C. and 50±5% relative humidity is preferably in the range from 0.5 to 3.8 MPa, particularly preferably in the range from 1 to 3.5 MPa, or from 1.8 to 3.0 MPa.

The tensile resistance of the sealing compounds of the invention determined according to ISO 37 and measured after 168 hours at 60° C. in case of fuel storage of type Jet A1 fuel lies in the range from 0.5 to 3.5 MPa, particularly preferably in the range from 1 to 3.0 or 1.5 to 2.8 MPa.

The tensile resistance of the sealing compounds of the invention determined according to ISO 37 and measured after 300 hours at 100° C. in case of fuel storage of type Jet A1 fuel is preferably in the range from 0.5 to 3.5 MPa, particularly preferably in the range from 1 to 3.0 MPa or 1.2 to 2.8 MPa.

The tensile resistance of the sealing compounds according to the invention determined according to ISO 37 and measured after 1000 hours at 35° C. with water immersion is preferably in the range from 0.5 to 3.5 MPa, particularly preferably in the range from 1 to 3.0 MPa, or from 1.5 to 2.7 MPa.

The inventive sealing compounds system and/or the sealing compound according to the invention preferably have a Shore A hardness of at least 10, measured 5 to 600 minutes after high-energy actinic irradiation, and a Shore A hardness in the range from 30 to 60, measured 2 weeks after high-energy actinic radiation.

And/or the low-temperature flexibility of the sealing compounds of the invention is determined by storing the sealing compound, in particular in the form of a film, after the high-energy actinic irradiation, for 2 weeks at an ambient temperature of 23±2° C. and relative humidity of 50±5%, then by briefly cooling the same to a temperature of −55±2° C., bending them at this low temperature at an angle of 30° and then visually examining the same at room temperature for the detection of defects, according to an internal test protocol. Hereby, the inventive compounds preferably show no cracks and no other defects caused by the bending at low temperature.

The inventive sealing compound system and/or the sealing compound according to the invention preferably have, after complete curing, the following properties:

No cracks or other defects in the sealing compound, which could be caused in the determination of the low-temperature flexibility by bending at an angle of 30° at a temperature of −55±2° C., a tensile resistance in the range from 0.5 to 3.8 MPa after 168 hours of fuel storage at a temperature of 60° C., after 300 hours of fuel storage at a temperature of 100° C. and after 1000 hours of storage in water at a temperature of 35° C., an elongation at rupture in the range from 100 to 800% after 168 hours of fuel storage at a temperature of 60° C., after 300 hours of fuel storage at a temperature of 100° C. and after 1000 hours of storage in water at a temperature of 35° C. and/or a density in the range from 1.00 to 1.50 g/cm$^3$.

The inventive sealing compounds system and/or the sealing compound according to the invention preferably have, after complete curing, the following properties:

A tensile strength in the range from 0.5 to 3.5 MPa, an elongation at rupture in the range from 100 to 900% and/or a peeling resistance in the range from 50 to 300 N/25 mm.

The peeling resistance is determined, in particular on substrates of aluminum or aluminum alloys, titanium or titanium alloys, stainless steels, composite materials such as carbon fiber reinforced plastic CFRP and/or painted substrates, for example, with at least a solvent-containing or aqueous base-coat and/or top-coat, particularly those based on epoxy, polyester or polyurethane paint.

Additional surprising advantages are listed in the following:

The photoinitiators, which release tertiary amine and/or amidine and/or guanidine, also surprisingly initiate and/or accelerate, upon energy actinic irradiation, the reaction of epoxy compounds with mercaptans, for example when the mixture according to the invention of the sealing compound is exposed to UV light.

It was surprising that a photoinitiator, which releases only small amounts of tertiary amine radical, amidine radical and/or guanidine radical, provides sufficient amounts of catalytic activity for the curing of base masses.

It was surprising that in many cases a small amount, such as 0.1 wt.-% of photoinitiator in the sealing compound is already sufficient for catalytically activating hidden sites, undercuts, and holes.

It was surprising that with the inventive sealing mass system both the curing of larger layer thicknesses of, for example, about 7 mm and the accelerated curing of these layer thicknesses is achieved.

Apparently, it is the first time that such very fast surface curing and long-processing sealing compounds are described.

Apparently, it is the first time that such very fast surface curing and even on command ("on demand") curing sealing compounds are described.

Surprisingly, with given processing times, extremely short tack-free times and also very short through-hardening times are achieved, with respect to the state of the art.

Surprisingly, it has been determined, that the inventive sealing compounds often require very low doses of UV radiation in order to start the curing, i.e. with a UV dose from about 1 J/cm$^2$.

In the inventive method, both particularly thin layers of sealing compounds, such as from 0.1 to 0.5 μm, and even very thick layers of 3 to 7 mm cured with UV light, in the range from approximately 0.1 to 7 mm, can be cured. The sealing compounds may be applied flat or bead-like.

The inventive coating method is particularly suitable for the aircraft industry, but can also be used wherever a fast through-hardening and, above all, a very fast superficial curing with a relatively long processing time of the sealing compound is required and/or advantageous.

The inventive coating method is particularly suitable for sealing of construction elements, such as tanks and areas to be sealed, such as pavements in service stations and chemical plants, for connecting overlying construction elements, such as metal sheets, films and other substrates, for filling cavities and interspaces, for coating of in particular metallic materials and composites, such as carbon fiber reinforced or glass fiber reinforced plastic materials, for aerodynamic smoothing and sealing as well as for corrosion protection in places, where, in the area of holes, for example, the corrosion protection layers of the metallic elements are damaged or removed. It can also have a supporting function during transportation, for example.

The inventive method is particularly suitable for use in the transportation industry, such as in the car industry, in the railway sector, in ship building, in aircraft industry, or in the space vehicle construction, in the mechanical industry, in civil engineering or for the manufacturing of furniture.

The inventive sealing compound system, the inventive base mass, the inventive curing agent and/or the inventive sealing compound are in particular suitable for use for construction and maintenance of aircraft and spacecraft, cars and railway vehicles, in ship building, in the machine industry, civil engineering for sealing of floor slabs, for example, in service stations and chemical plants as well as a casting resin or for the production of casting resins for the electric and electronic sector.

EXAMPLES AND COMPARATIVE EXAMPLES

The object of the invention is explained in the following by means of exemplary embodiments.

General Production and Testing Specifications for the Inventive Sealing Compounds:

The basic composition of the invention was prepared by first mixing polysulfide polymers such as Thiokol® LP 12, Thioplast® G 10 and/or Thioplast® G131, and/or polythioether polymers and/or polythioethersulfide polymers and/or polyetherpolymers, at least one photoinitiator based on hindered tertiary amine and/or amidine and/or guanidine, at least one photosensitizer, based on benzophenone and/or isopropyl, a thixotropic agent, such as on the basis of sepiolite, and an adhesion promoter such as based on a phenol resin or based on organofunctional alkoxysilane, for 10 minutes under vacuum of <50 mbar and under cooling of a planetary dissolver with cooling water at a speed of about 2000 rpm. Subsequently, the remaining fillers, such as those based on magnesium silicate hydrates, aluminum silicates, calcium silicates, polyamides and/or polyethylene waxes, and antioxidants, such as those based on phosphorous acid ester, were added for a further 10 to 20 minutes under vacuum of <50 mbar by planetary dissolver, dispersed at a speed of about 2000 rpm. The polysulfide, polythioethers, polythioethersulfides, polyether copolymers and their copolymers were always mercapto-terminated.

For good dispersion of the base mass, in particular speed ranges from 1800 to 2200 rpm and times of 30 to 40 minutes depending on the composition, rheological properties and on apparatus equipment are suitable.

The curing agent according to the invention was prepared by mixing the epoxy compounds with the thixotropic agent on the basis of fumed silica Aerosil® R202 under vacuum of <50 mbar using a planetary dissolver at a speed of about 2000 rpm.

For compaction, filling and/or coating of structural parts and for the manufacture of test specimens, the base mass and curing agent were mixed at a ratio of 100:5 to 100:7, and then activated by high-energy actinic radiation. The sealing compounds of the invention were cured even without high-energy actinic radiation, wherein, depending on layer thickness, a curing time in the range from 24 to 168 hours with layer thicknesses in the range from 0.2 to 6 mm was required.

The mechanical properties of sealing compounds, such as Shore A hardness determined according to ISO 7619-1, tensile strength and elongation determined according to ISO 37 were determined after the sealing compound had been stored for 7 days in air at an ambient air temperature of 23° C. and relative humidity of 50%. After mixing of the base mass with the curing agent, the sealing compound was immediately applied on a substrate with the curing agent in air, the sealing compound on a substrate and then immediately irradiated with high-energy actinic radiation. From then on, it was stored in air.

To activate the sealing compound, normally, a UV surface emitter with a Fe-doped Hg lamp was used at a power of 400 W. Herein, for curing of the actinically activated coatings, all commercially available UV light sources, including ultraviolet light-emitting diodes and fluorescent lamps, or electron beam sources are suitable. The sealing compounds can be cured at a wavelength in the range 315 to 600 nm, such as with UVA and/or UV/VIS.

The formulations listed in Table 4 of the inventive examples were prepared in order to determine the influence of three different photoinitiators on the processing properties of the uncured base mass and on the curing sealing compound, as well as on the mechanical properties of the sealing compound. The basic compositions of the invention and the curing agent compositions were prepared as in all the other examples according to the prescriptions. Both partial mixtures were homogeneously mixed in a mass ratio of 100:5 with a layer thickness of 2 mm on sheets of aluminum alloy by extrusion from a mixer cartridge, applied at about 23° C. and subsequently irradiated with an Fe-doped UV surface radiator at wavelengths in the range from 300 to 600 nm, with a UV dose of about 10 J/cm$^2$ and with a UV intensity of 0.3 W/cm$^2$ at a distance of 10 cm for over 40 s. Here, the curable coating warmed slightly, though it didn't reach 60° C.

Subsequently, the cured sealing compounds were removed from the test mold and stored for 7 days at 23±2° C. at 50±5% relative humidity in air, before the mechanical properties such as hardness, elongation and tensile strength were determined. After storage in air, subsequently a storage in various other media took place, see Table 7 below.

As a photoinitiator 1, 2-dimethylamino-2-(4-methyl-benzyl)-1-(4-morpholin-4-yl-phenyl)-butan-1-one was used. As a photoinitiator 2, 2-benzyl-2-dimethyl-amino-1-(4-morpholinophenyl)-butanone-1 was used. As photoinitiator 3, a sterically hindered DBN was used. As an additional catalyst, triethylene diamine was used. As the curing agent, a mixture of a bisphenol A epoxy resin having an epoxy equivalent weight of 180-195 g/eq and a viscosity of 10-15 Pas (available as Epikote 828 or DER 331) and reactive diluent based on 1,4-butanediol diglycidyl ether were used. The mixture ratio of bisphenol A epoxy resin and reactive diluent was 4:1. The measured properties of the examples are listed in Table 5 below.

Comparative Example 1 (CE1) does not contain a photoinitiator, and was prepared for better comparison of the effects of the individual photoinitiators. The comparative examples 2 and 3 (CE2 and CE3) contain, as photoinitiators, sterically hindered tertiary amines, which, however, after activation with UV light, have a too low basicity to initiate and/or accelerate the curing reaction. Therefore, here, no advantage can be seen in comparison to VB1. Surprisingly, Example 1 (B1) shows a significantly accelerated reaction due to the use of the sterically hindered DBN. Accordingly, the sterically hindered DBN seems to have sufficiently high basicity to catalyze the reaction between the SH-groups and the epoxy groups.

TABLE 4

Composition of VB1 to VB3 and B1

| Content (wt.-%) | example | | | |
|---|---|---|---|---|
| | VB1 | VB2 | VB3 | B1 |
| Base mass | | | | |
| Polythioethersulfide 1 (3500-4400 g/mol) | 71.6 | 69.7 | 69.7 | 69.7 |
| Photoinitiator 1 | | 1 | | |
| Photoinitiator 2 | | | 1 | |
| Photoinitiator 3 | | | | 1 |
| 1,4-dimethylpiperazine | 0.4 | 0.4 | 0.4 | 0.4 |
| Photosensitizer: benzophenone | | 0.9 | 0.9 | 0.9 |
| Filler aluminum silicate | 22.0 | 22.0 | 22.0 | 20.2 |
| Adhesion promoter mercaptopropyl trimethoxysilane | 1.0 | 1.0 | 1.0 | 1.0 |
| Thixotropic agent; sepiolite | 3.0 | 3.0 | 3.0 | 3.0 |
| Anti-ageing agent phosphorous acid ester | 2.0 | 2.0 | 2.0 | 2.0 |
| Sum | 100 | 100 | 100 | 100 |
| Curing agent | | | | |
| Bisphenol A-epoxy resin | 78.4 | 78.4 | 78.4 | 78.4 |
| 1,4-butandioldiglycidyl ether | 19.6 | 19.6 | 19.6 | 19.6 |
| Fumed silica | 2 | 2 | 2 | 2 |
| Sum | 100 | 100 | 100 | 100 |
| Mixing ratio base mass/curing agent | 100:5 | 100:5 | 100:5 | 100:5 |

TABLE 5

Properties of VB1 to VB3 as well as B1

| Properties | example | | | |
|---|---|---|---|---|
| | VB1 | VB2 | VB3 | B1 |
| Processing time (min) | 120 | 120 | 120 | 60 |
| Tack-free time (min) | 405 | 415 | 410 | 5 |
| Through-hardening time for initial hardness Shore A 30 (min) | 535 | 540 | 535 | 90 |
| Shore A hardness after 7 days RT | 48 | 49 | 48 | 47 |

TABLE 5-continued

Properties of VB1 to VB3 as well as B1

| Properties | example | | | |
|---|---|---|---|---|
| | VB1 | VB2 | VB3 | B1 |
| Tensile resistance (MPa) after 7 days RT | 1.85 | 1.89 | 1.83 | 1.92 |
| Elongation (%) after 7 days RT | 398 | 391 | 401 | 397 |

In the following example 2 (B2) and in the comparative example 4 (VB4) an inventive formulation with the conventional manganese-dioxide curing sealing compound MC-780 B-1/2 is compared, which is commercially available. B2 is once activated by UV light, and a second time it is not activated by UV light. Table 6 shows the composition of these formulations. Table 7 shows properties of these sealing compounds. It can be clearly seen that both sealing compounds have the same processing time. Surprisingly, the inventive sealing compound reaches the tack-free state in a much shorter time as well as the initial hardness of 30 Shore A, with respect to MC-780 B-1/2, if it was previously activated by UV light. Otherwise, the sealing compound still reaches its end properties, although after a much longer time. The inventive sealing compound surprisingly has good mechanical properties even after storage in various mediums and higher temperatures, such as in case of storage in water at 35° C. or in fuel at 60° C. or 100° C.

TABLE 6

Composition of B2 and VB4

| Content (wt.-%) | example | |
|---|---|---|
| | B2 | VB4 |
| Base mass | | |
| Base mass MC-780 B-1/2 | | 100 |
| Polythioethersulfide 1 (3500-4400 g/mol) | 47.3 | |
| Polythioethersulfide 2 (1500-2400 g/mol) | 20.5 | |
| Photoinitiator 3 | 1.5 | |
| 1,4-dimethylpiperazine | 0.6 | |
| Photosensitizer: isopropylthioxanthone | 1.3 | |
| Filler feldspar | 22.0 | |
| Adhesion promoter mercaptopropyl trimethoxysilane | 1.5 | |
| Thixotropic agent; sepiolite | 3.2 | |
| Anti-ageing agent phosphorous acid ester | 2.1 | |
| Sum | 100 | 100 |
| Curing agent | | |
| Curing agent MC-780 B-1/2 | | 100 |
| Bisphenol A-epoxy resin | 78.4 | |
| 1,4-butandioldiglycidyl ether | 19.6 | |
| Fumed silica | 2 | |
| Sum | 100 | 100 |
| Mixing ratio base mass/curing agent | 100:7 | 100:10 |

TABLE 7

Comparison of properties of B2 and VB4

| Properties | B2 with activated UV light | B2 without activated UV light | VB4 |
|---|---|---|---|
| Processing time (min) | 30 | 30 | 30 |
| Tack-free time (min) | 5 | 510 | 240 |
| Through-hardening time for initial hardness Shore A 30 (min) | 40 | 970 | 480 |
| Shore A hardness after 7 days RT | 53 | 53 | 50 |
| Tensile resistance (MPa) after 7 days RT | 2.20 | 2.18 | 1.5-2.2 |
| Elongation (%) after 7 days RT | 318 | 323 | 300-400 |
| Tensile resistance (MPa) after 168 hours at 60° C., fuel storage | 2.12 | 2.09 | 1.5-2.0 |
| Elongation (%) after 168 hours at 60° C., fuel storage | 309 | 312 | 300-400 |
| Tensile resistance (MPa) after 300 hours at 100° C., fuel storage | 1.85 | 1.87 | 1.5-2.0 |
| Elongation (%) after 300 hours at 100° C., fuel storage | 252 | 257 | 300-400 |
| Tensile resistance (MPa) after 1000 hours at 35° C., water storage | 1.91 | 1.89 | 1.0-1.5 |
| Elongation (%) after 1000 hours at 35° C., water storage | 298 | 295 | 300-400 |

It is also possible to use an inventive sealing compound without an additional sterically not hindered catalyst in the formulation, see examples 6 and 7 (B3 and B4). Table 8 shows the composition of these examples and table 9 the measured properties. It can be clearly seen that the sealing compound curing speed is much slower without the additional sterically unhindered catalyst.

In general, the highly valuable properties of conventional aircraft sealing compounds such as a high resistance to various mediums such as fuels at 60° C., measured after 168 hours and 100° C., for example, and the waterproofness at 35° C., measured after 1000 hours, the resistance to hydraulic liquids, condensed water, and anti-freeze liquid, high thermal resistance, high low temperature flexibility, high resistance to meteorological agents, high peeling resistance on different substrates, high elongation at rupture and high tensile strength may be substantially or completely achieved, in spite of the much shorter curing.

TABLE 8

Composition of B3 and B4

| Content (wt.-%) | B3 | B4 |
|---|---|---|
| Base mass | | |
| Polythioethersulfide 1 (3500-4400 g/mol) | 50.1 | 49.6 |
| Polythioethersulfide 2 (1500-2400 g/mol) | 15.8 | 15.8 |
| Photoinitiator 3 | 2.3 | 2.3 |
| 1,4-dimethylpiperazine | 0.0 | 0.5 |
| Photosensitizer: benzophenone | 1.0 | 1.0 |
| Filler aluminum silicate | 24.3 | 24.3 |
| Adhesion promoter mercaptopropyl trimethoxysilane | 1.6 | 1.6 |
| Thixotropic agent; sepiolite | 2.4 | 2.4 |
| Anti-ageing agent phosphorous acid ester | 2.1 | 2.1 |
| Sum | 100 | 100 |
| Curing agent | | |
| Bisphenol F-epoxy resin | 80.2 | 80.2 |
| 1,4-butandioldiglycidyl ether | 17.6 | 17.6 |
| Fumed silica | 2.2 | 2.2 |
| Sum | 100 | 100 |
| Mixing ratio base mass/curing agent | 100:6 | 100:6 |

TABLE 9

Properties of B3 and B4

| Properties | B3 | B4 |
|---|---|---|
| Processing time (min) | 120 | 20 |
| Tack-free time (min) | 5 | 5 |
| Through-hardening time for initial hardness Shore A 30 (min) | 490 | 30 |
| Shore A hardness after 7 days RT | 45 | 46 |
| Tensile resistance (MPa) after 7 days RT | 1.76 | 1.80 |
| Elongation (%) after 7 days RT | 357 | 345 |

The invention claimed is:

1. A sealing compound for coating a substrate, comprising a mixture of a predominantly uncured base mass and a curing agent comprising at least one epoxy composition,
   the base mass comprises a mercapto-terminated base polymer, based on polyether, polythioether, polythioethersulfide, polysulfide, copolymers thereof or mixtures thereof,
   the base mass, the curing agent or both comprises at least one photoinitiator based on a sterically hindered nitrogen-containing organic base,
   wherein a molar excess of epoxy composition in the range from 1.05 to 2 with respect to 1 mole of reactive SH-groups relative to the total content of mercapto-terminated base polymer is present, and,
   through the effects of high-energy actinic radiation, the at least one photoinitiator cleaves at least one radical per molecule based on a nitrogen-containing organic base, from which a nitrogen-containing organic base having a pKa value of the conjugated acid in the region of 6 to 30 is formed, which acts as an active catalyst for the curing of the base mass.

2. The sealing compound of claim 1, characterized in that it has a tack-free time, according to DIN 65262-1, in the range from 0.01 to 10 minutes after starting a high-energy actinic irradiation.

3. The sealing compound of claim 1, characterized in that the base mass is essentially based on at least one liquid polyether composition, which carries at the ends of molecules one respective mercapto-group, and which, optionally, contains up to about 50 mol % of disulfide groups within the molecule (polythioethersulfide).

4. The sealing compound of claim 3, characterized in that the base mass contains, in addition to the at least one liquid polythioether composition, at least one disulfide-containing composition with a percentage on base mass of up to 80 wt.%.

5. The sealing compound of claim 1, characterized in that the base polymer comprises mercapto-terminated polysulfide polymers, mercapto-terminated polythioether, mercapto-terminated polythioethersulfide, or combinations thereof, which comprise long-chain polymers with a molecular weight in particular in the range from 2500 to 6000 g/mol and short chain polymers with a molecular weight in particular in the range from 500 to 2500 g/mol, wherein the ratio of the long-chain polymers to the short chain polymers is from 25:1 to 0.5:1.

6. The sealing compound of claim 1, characterized in that the base polymer comprises a proportion of mercaptan related to reactive SH-groups with respect to the total base polymer in the range from 0.5 to 10 wt.%, a total sulfur content in the range from 1 to 50 wt.%, and an average functionality of reactive end groups of mercapto-groups per molecule in the range from 1.5 to 2.5.

7. The sealing compound of claim 1, characterized in that the at least one epoxy composition is based on epoxy novolac resins, bisphenol A-epoxy resins, bisphenol F-epoxy resins or combinations thereof.

8. The sealing compound of claim 7, characterized in that the at least one epoxy composition is based on bisphenol A-epoxy resins with an epoxy equivalent weight in the range from 170 to 200 g/eq, based on bisphenol F-resin with an epoxy equivalent weight in the range from 150 to 180 g/eq, based on epoxy novolac resins with an epoxy equivalent weight in the range from 160 to 220 g/eq or a combination thereof.

9. The sealing compound of claim 1, characterized in that the at least one epoxy composition comprises 1,4-butandiol-diglycidyl ether, 2-ethyl-hexyl-glycidether, 1,6-hexandiol-diglycidyl ether (reactive thinner) or a combination thereof.

10. The sealing compound of claim 1, characterized in that the pKa value of the conjugated acid of the nitrogen-containing organic base, lies in the range from 7 to 280.

11. The sealing compound of claim 1, characterized in that the at least one photoinitiator is a sterically hindered tertiary amine, a sterically hindered amidine, a sterically hindered guanidine, or a combination thereof.

12. The sealing compound of claim 11, characterized in that the at least one photoinitiator is added in a quantity which corresponds to a proportion of 0.05 to 5 wt.% with respect to the sealing compound.

13. The sealing compound of claim 11, characterized in that the at least one photoinitiator is a photolatent 1,5-diazabicyclo[4.3.0]non-5-en (DBN), a photolatent 1,8-diazabicyclo[5.4.0]undec-7-en (DBU), a photolatent TMG (tetramethylguanidine), a photolatent triethylendiamine (1,4-diazabicyclo[2.2.2]octane), or a combination thereof.

14. The sealing compound of claim 1, further comprising an additional, free catalyst, which is a free nitrogen-containing organic base with a pKa value of the conjugated acid in the range from 6 to 30 and said additional free catalyst is a free tertiary amine, a free amidine, a free guanidine, or a combination thereof.

15. The sealing compound of claim 14, characterized in that the free catalyst is selected from the group consisting of 1,4-dimethylpiperazine, N-methylmorpholine, 2,2'-dimorpholinodiethylether, tris-(dimethylaminomethyl-phenol), triethylendiamine, and TMG.

16. The sealing compound of claim 1, further comprising a photosensitizer.

17. A method for coating a substrate with a sealing compound, said method comprising
    coating a substrate with the sealing compound of claim 1,
    irradiating said sealing compound with high energy actinic radiation, and
    curing said sealing compound thereby coating said substrate.

18. The method of claim 17, characterized in that the high-energy actinic radiation has a wavelength in the range from 315 to 600 nm.

19. The method of claim 17, characterized in that the curing is performed at a temperature of from 10 to 40° C.

20. An aircraft containing components which are sealed with a sealing compound of claim 1.

21. The sealing compound of claim 1, wherein said substrate is a component, for construction and/or maintenance of aerospace vehicles, for cars and railway vehicles, in shipbuilding, in the mechanical industry, in the civil building industry, for casting resin or for production of cast resins for the electric and electronic industry.

22. The method of claim 17, wherein said substrate is a component in the transportation industry, in the automobile industry, in the railway vehicle construction sector, in shipbuilding, in the construction of aircraft or in the spacecraft industry, in the mechanical sector, in the civil building industry or for the manufacturing of furniture.

* * * * *